US010956071B2

(12) United States Patent
Subbarao

(10) Patent No.: US 10,956,071 B2
(45) Date of Patent: Mar. 23, 2021

(54) CONTAINER KEY VALUE STORE FOR DATA STORAGE DEVICES

(71) Applicant: Western Digital Technologies, Inc., San Jose, CA (US)

(72) Inventor: Sanjay Subbarao, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 67 days.

(21) Appl. No.: 16/246,425

(22) Filed: Jan. 11, 2019

(65) Prior Publication Data

US 2020/0104047 A1  Apr. 2, 2020

Related U.S. Application Data

(60) Provisional application No. 62/739,614, filed on Oct. 1, 2018.

(51) Int. Cl.
*G06F 3/06* (2006.01)
*G06F 16/11* (2019.01)

(52) U.S. Cl.
CPC ............ *G06F 3/064* (2013.01); *G06F 3/061* (2013.01); *G06F 3/0679* (2013.01); *G06F 16/122* (2019.01)

(58) Field of Classification Search
CPC ...... G06F 3/0661; G06F 3/0679; G06F 3/061; G06F 16/122; G06F 3/064; G06F 16/11; G06F 3/06
USPC .................................................. 711/156, 103
See application file for complete search history.

(56) References Cited

U.S. PATENT DOCUMENTS

| 4,420,807 A | 12/1983 | Nolta et al. |
| 5,608,876 A | 3/1997 | Cohen et al. |
| 6,772,296 B1 | 8/2004 | Mathiske |
| 6,856,556 B1 | 2/2005 | Hajeck |
| 7,023,726 B1 | 4/2006 | Chen et al. |

(Continued)

FOREIGN PATENT DOCUMENTS

WO  2012134641 A2  10/2012

OTHER PUBLICATIONS

Z. Xu, R. Li and C. Xu, "CAST: A page-level FTL with compact address mapping and parallel data blocks," 2012 IEEE 31st International Performance Computing and Communications Conference (IPCCC), Austin, TX, 2012, pp. 142-151.*

(Continued)

*Primary Examiner* — Pierre Miche Bataille
(74) *Attorney, Agent, or Firm* — Barry IP Law, P.C.

(57) ABSTRACT

A Data Storage Device (DSD) includes at least one non-volatile storage media. A command is received to modify a portion of a data object or file, with the command being byte-addressable for overwriting, deleting or adding the modified portion. The modified portion of the data object or file is written with an indication of a page container entry at a storage location in the at least one non-volatile storage media. The page container points to a previous storage location for previously written data for the data object or file that was most recently written before writing the modified portion. A mapping or data container entry in a container data structure is updated for the data object or file to point to the storage location storing the modified portion of the data object or file and the indication of the page container entry.

23 Claims, 10 Drawing Sheets

(56) References Cited

U.S. PATENT DOCUMENTS

| | | |
|---|---|---|
| 7,126,857 B2 | 10/2006 | Hajeck |
| 7,216,211 B2 | 5/2007 | Munguia et al. |
| 7,386,655 B2 | 6/2008 | Gorobets et al. |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,904,619 B2 | 3/2011 | Danilak |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 7,979,601 B2 | 7/2011 | Berenbaum et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | DeForest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,631,191 B2 | 1/2014 | Hashimoto |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,392 B1 | 5/2014 | Asnaashari et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 8,903,995 B1 | 12/2014 | Basak et al. |
| 8,947,803 B1 | 2/2015 | Yamakawa et al. |
| 9,015,123 B1* | 4/2015 | Mathew ............... G06F 16/178 |
| | | 707/646 |
| 9,116,800 B2 | 8/2015 | Post et al. |
| 9,189,387 B1 | 11/2015 | Taylor et al. |
| 9,342,453 B2 | 5/2016 | Nale et al. |
| 9,619,174 B2 | 4/2017 | Chen et al. |
| 9,836,404 B2 | 12/2017 | Ummadi et al. |
| 9,857,995 B1 | 1/2018 | Malina et al. |
| 10,126,981 B1 | 11/2018 | Malina et al. |
| 10,423,536 B2 | 9/2019 | Noguchi et al. |
| 10,482,009 B1 | 11/2019 | Sabol et al. |
| 10,496,544 B2 | 12/2019 | Wang et al. |
| 2008/0148048 A1 | 6/2008 | Govil et al. |
| 2010/0037002 A1 | 2/2010 | Bennett |
| 2010/0174849 A1 | 7/2010 | Walston et al. |
| 2010/0250793 A1 | 9/2010 | Syu |
| 2011/0099323 A1 | 4/2011 | Syu |
| 2011/0283049 A1 | 11/2011 | Kang et al. |
| 2012/0166891 A1 | 6/2012 | Dahlen et al. |
| 2012/0210068 A1 | 8/2012 | Joshi et al. |
| 2012/0239860 A1* | 9/2012 | Atkisson ............ G06F 12/0246 |
| | | 711/103 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0317377 A1 | 12/2012 | Palay et al. |
| 2012/0324191 A1 | 12/2012 | Strange et al. |
| 2012/0331016 A1 | 12/2012 | Janson et al. |
| 2013/0080687 A1 | 3/2013 | Nemazie et al. |
| 2013/0091321 A1 | 4/2013 | Nishtala et al. |
| 2013/0132638 A1 | 5/2013 | Horn et al. |
| 2013/0145106 A1 | 6/2013 | Kan |
| 2013/0205114 A1* | 8/2013 | Badam ................. G06F 3/0679 |
| | | 711/207 |
| 2013/0290793 A1 | 10/2013 | Booth et al. |
| 2014/0006686 A1 | 1/2014 | Chen et al. |
| 2014/0059405 A1 | 2/2014 | Syu et al. |
| 2014/0101369 A1 | 4/2014 | Tomlin et al. |
| 2014/0108703 A1 | 4/2014 | Cohen et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0226389 A1 | 8/2014 | Ebsen et al. |
| 2014/0351515 A1 | 11/2014 | Chiu et al. |
| 2015/0058534 A1 | 2/2015 | Lin |
| 2015/0142996 A1 | 5/2015 | Lu |
| 2015/0302903 A1 | 10/2015 | Chaurasia et al. |
| 2015/0363320 A1 | 12/2015 | Kumar et al. |
| 2016/0027481 A1 | 1/2016 | Hong |
| 2016/0118130 A1 | 4/2016 | Chadha et al. |
| 2016/0313943 A1 | 10/2016 | Hashimoto et al. |
| 2016/0342357 A1 | 11/2016 | Ramamoorthy et al. |
| 2016/0357463 A1 | 12/2016 | DeNeui et al. |
| 2016/0378337 A1 | 12/2016 | Horspool et al. |
| 2017/0024332 A1 | 1/2017 | Rui et al. |
| 2017/0147499 A1 | 5/2017 | Mohan et al. |
| 2017/0160987 A1 | 6/2017 | Royer, Jr. et al. |
| 2017/0185347 A1* | 6/2017 | Flynn ................... G06F 3/0652 |
| 2017/0228170 A1 | 8/2017 | Chen et al. |
| 2017/0270041 A1* | 9/2017 | Talagala ................. G06F 12/08 |
| 2017/0286291 A1 | 10/2017 | Thomas |
| 2018/0004438 A1 | 1/2018 | Hady |
| 2018/0032432 A1* | 2/2018 | Kowles ................ G06F 3/0679 |
| 2018/0095898 A1 | 4/2018 | Khosravi et al. |
| 2018/0150404 A1 | 5/2018 | Kim et al. |
| 2018/0307620 A1* | 10/2018 | Zhou ................. G06F 12/0246 |

(56) References Cited

U.S. PATENT DOCUMENTS

| | | | |
|---|---|---|---|
| 2018/0349041 | A1 | 12/2018 | Zhou et al. |
| 2019/0163375 | A1 | 5/2019 | Amidi et al. |
| 2019/0188153 | A1 | 6/2019 | Benisty et al. |
| 2019/0310796 | A1 | 10/2019 | Perez et al. |
| 2019/0339904 | A1 | 11/2019 | Myran et al. |
| 2019/0347204 | A1 | 11/2019 | Du et al. |

OTHER PUBLICATIONS

A. Karypidis and S. Lalis, "The tangible file system," 23rd International Conference on Distributed Computing Systems Workshops, 2003. Proceedings., Providence, Rhode Island, USA, 2003, pp. 268-273.*

M. Seltzer, V. Marathe and S. Byan, "An NVM Carol: Visions of NVM Past, Present, and Future," 2018 IEEE 34th International Conference on Data Engineering (ICDE), Paris, 2018, pp. 15-23.*

Pending U.S. Appl. No. 16/921,719, filed Jul. 6, 2020, entitled "Data Access in Data Storage Device Including Storage Class Memory", Dubeyko et al.

Pending U.S. Appl. No. 16/246,401, filed Jan. 11, 2019, entitled "Fine Granularity Translation Layer for Data Storage Devices", Sanjay Subbarao.

Phil Mills, "Storage Class Memory—the Future of Solid State Storage,"http://www.snia.org/sites/default/education/tutorials/2009/fall/solid/PhilMills_The_Future_of_Solid_State_Storage.pdf., SNIA Education, 2009.

Pending U.S. Appl. No. 16/176,997, filed Oct. 31, 2018, entitled "Tiered Storage Using Storage Class Memory", James N. Malina.

Pending U.S. Appl. No. 16/683,095, filed Nov. 13, 2019, entitled "Storage Class Memory ACCESS", Manzanares et al.

Kang et al.; "Subpage-based Flash Translation Layer for Solid State Drivers"; Jan. 2006; 10 pages; available at: https://cs.kaist.ac.kr/fileDownload?kind=tech&sn=340.

Kim et al.; "Partial Page Buffering for Consumer Devices with Flash Storage"; Proceedings 2013 IEEE 3rd International Conference on Consumer Electronics—Berlin, ICCE-Berlin 2013 (pp. 177-180); available at: https://hanyang.elsevierpure.com/en/publications/partial-page-buffering-for-consumer-devices-with-flash-storage.

Wu et al.; "Delta-FTL: Improving SSD Lifetime via Exploiting Content Locality"; Apr. 10-13, 2012; 13 pages; available at: https://cis.temple.edu/~he/publications/Conferences/DeltaFTL-Eurosys12.pdf.

Xia et al.; "Edelta: A Word-Enlarging Based Fast Delta Compression Approach"; Jul. 2015; 5 pages; available at: https://www.usenix.org/system/files/conference/hotstorage15/hotstorage15-xia.pdf.

Pending U.S. Appl. No. 16/196,077, filed Nov. 20, 2018, entitled "Data Access in Data Storage Device Including Storage Class Memory", Dubeyko et al.

Hitachi Vantara; "Hitachi Accelerated Flash 2.0"; Sep. 2018; 20 pages; available at: https://www.hitachivantara.com/en-us/pdfd/white-paper/accelerated-flash-whitepaper.pdf.

Pending U.S. Appl. No. 16/867,793, filed May 6, 2020, entitled "Page Modification Encoding and Caching", Cassuto et al.

International Search Report and Written Opinion dated Nov. 6, 2020 from counterpart International Application No. PCT/US2020/037713, 8 pages.

* cited by examiner

CONTAINER KEY VALUE STORE FOR DATA STORAGE DEVICES

CROSS-REFERENCE TO RELATED APPLICATION

This application claims the benefit of U.S. Provisional Application No. 62/739,614, entitled "CONTAINER KEY VALUE STORE" (Atty. Docket No. WDA-4019P-US), filed on Oct. 1, 2018, which is hereby incorporated by reference in its entirety.

BACKGROUND

Data stored in Data Storage Devices (DSDs) is conventionally accessed using a block interface based on a logical block size (e.g., 512 Bytes or 4K) or a transaction size of a file system executed by a host accessing the data. However, such conventional block interfaces can duplicate functions performed by the DSD and reduce performance of the system including the DSD and the host (e.g., less Input/Output Operations Per Second (IOPS)). For example, by using a flash DSD including flash memory as a block device, host software is unable to leverage capabilities of dynamic logical to physical remapping, space management, and Garbage Collection (GC) that may already exist within a Flash Translation Layer (FTL) of the DSD. Similar issues exist in cases of a host managed Shingled Magnetic Recording (SMR) Translation Layer (STL) that enable writes to non-sequential Logical Block Addresses (LBAs) on an SMR disk in the DSD.

There is a duplication of these functions of address remapping, space management, and data compaction or GC in object storage engines, such as LevelDB, RocksDB, and Cassandra. Log structured file systems, such as WAFL, HDFS, and BtrFS, similarly duplicate these functions at the host level.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Environment Examples

Figure 1A:
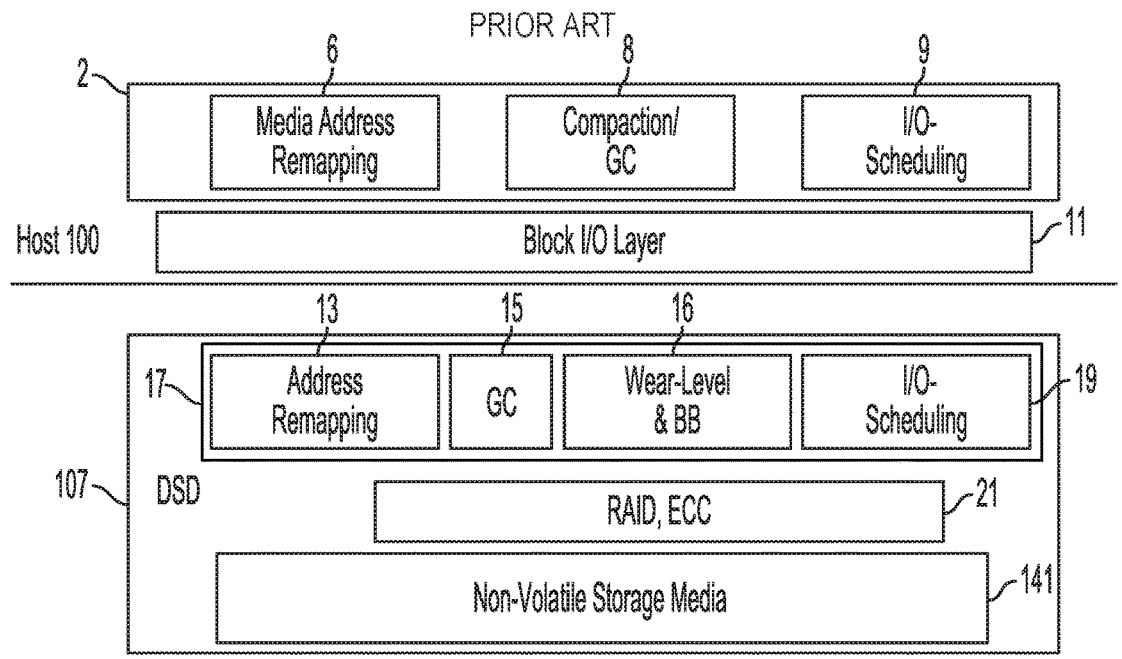
FIG. 1A illustrates a diagram of software layers conventionally implemented on a host side and a Data Storage Device (DSD) side.

FIG. 1A illustrates a diagram of software layers conventionally implemented on a host side and a Data Storage Device (DSD) side. As shown in FIG. 1A, the software layers on both the host side above the horizontal line in FIG. 1A and on the DSD side below the horizontal line perform similar or duplicative operations on non-volatile storage media 141 of DSD 107, such as with media address remapping 6 and address remapping 13, compaction/GC 8 and GC 15, and Input/Output (I/O) scheduling 9 and I/O scheduling 19. As a result, there is conventionally a duplication of these functions at both the DSD and at the host. Another layer at DSD 107, layer 21 in FIG. 1A, may implement other functions that are not performed at host 101, such as a Redundant Array of Independent Disks (RAID) function for parallel operation and/or data protection, and Error Correcting Code (ECC) for correcting data read from non-volatile storage media 141.

Host 100 may use interface 2 for accessing data objects or for accessing files. Interface 2 may include, for example, Amazon Simple Storage Service (S3) for accessing data objects or Network File System (NFS) for accessing files using a log structured storage engine that may perform media address remapping, compaction or GC, and I/O scheduling with modules 6, 8, and 9, respectively, of interface 2.

Block I/O layer 11 provides an interface for a file system of the host (e.g., WAFL, HDFS, or BTrFS) to interface between logical addressing (e.g., Logical Block Addresses (LBAs)) used by host 101 and the storage units in non-volatile storage media 141 of DSD 107 so that host 101 can provide commands to, for example, start reading data at an LBA and continue for a certain sector count or write data at an LBA and continue for a certain sector count. Block I/O layer 11 can include, for example, one or more drivers or storage systems for DSD 107 that implement communication protocols such as Small Computer System Interface (SCSI), Serially Attached SCSI (SAS), Non-Volatile Memory express (NVMe), or Peripheral Component Interconnect express (PCIe). Those of ordinary skill in the art will appreciate that other implementations may include different forms of a block I/O layer.

However, block I/O layer 11 prevents the upper layers of the storage device management on the host side from leveraging or taking advantage of the operations being performed by translation layer 17 at DSD 107. Instead, the upper layers of the host management of DSD 107 duplicate the functions of address remapping, space management, I/O scheduling, compaction (e.g., defragmentation) and/or GC. This results in poor resource utilization in terms of processing and memory resources in the system and limits the performance of the system in terms of I/O performance and data storage capacity.

To make matters worse, Log Structure Merge (LSM) tree-based object stores, such as LevelDB and RocksDB, can result in a high write amplification of over 30 times due to the exponential cost of merges as the number of levels increase with changes made to a data object or file. Write amplification can be understood as the actual number of writes to a storage medium as a result of a single write command from a host to write data for the command. In addition, the LSM operations of the block I/O layer at the host ordinarily duplicate the functions of GC and address remapping that are performed by DSD 107.

LSM object stores also cause high I/O amplification of eight to ten times for reads or queries due to hierarchical searching through bloom filters at various levels. In addition, the underlying file system and write-ahead logging, such as for power-fail data protection, causes further I/O amplification.

Figure 1B:
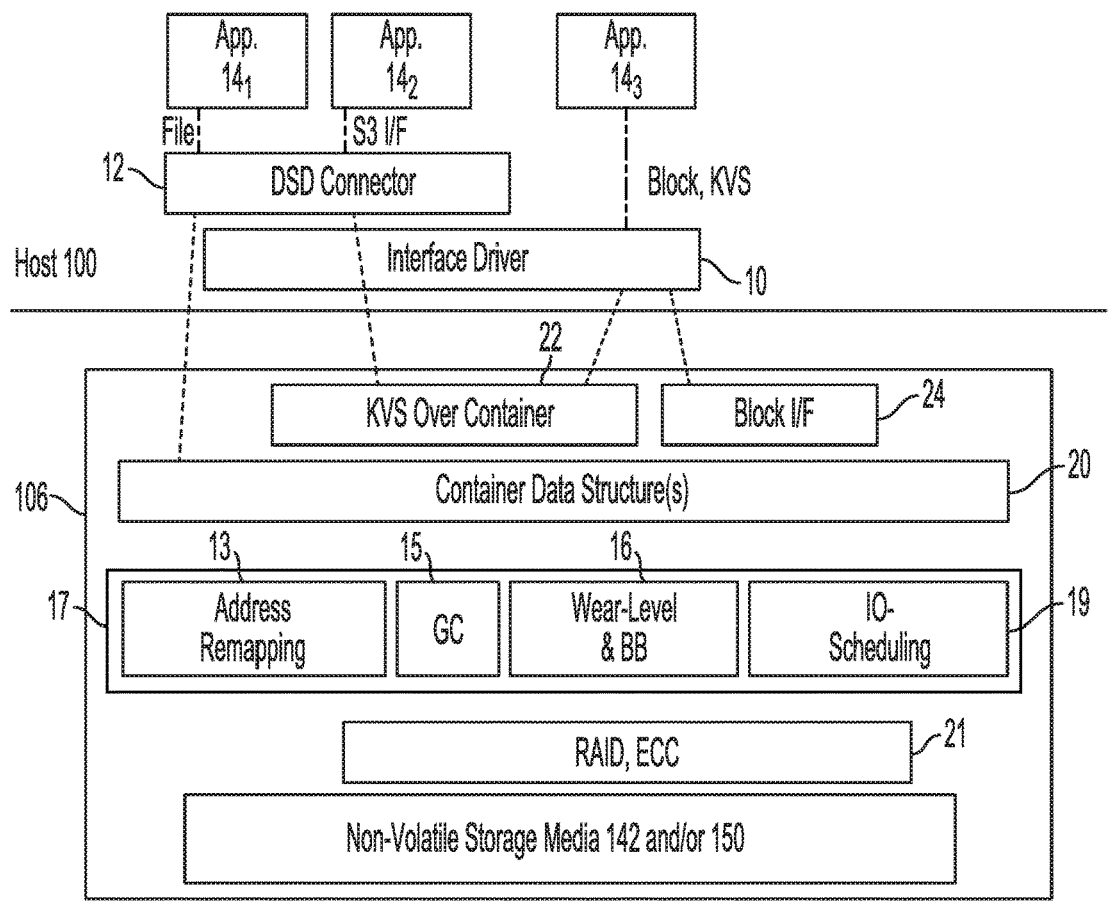
FIG. 1B illustrates a diagram of software layers implemented on a host side and a DSD side according to an embodiment of the present disclosure.

For example, a conventional block I/O layer or interface, such as interface 2 in FIG. 1B, that uses LSM operations to combine files may be performed as part of a data storage engine such as, for example, BigTable, LevelDB or RocksDB. The merging of files through multiple levels creates a write amplification of approximately 25 times and a typical command amplification of approximately 10 times. An application issuing a write command, for example, can result in 25 writes to the storage media and 10 I/O operations on the storage media due to the merging of files for use by a file system using the block I/O layer. This can have an especially large impact on performance in the case of Hard Disk Drives (HDDs), which require a mechanical seek time to access data on the storage media.

This reduces the application level I/O performance from that of the storage device I/O performance by a factor of 10 since an average of 10 I/O commands are performed at the storage device for every I/O command issued by the application. In addition, latency and wear is increased by the write amplification caused by the LSM operations of the block I/O layer.

FIG. 1B illustrates a diagram of software layers implemented on a host side and a storage device side according to an embodiment. In contrast to the conventional arrangement shown in FIG. 1A discussed above, block I/O layer 11 of FIG. 1A is replaced in FIG. 1B by Key Value Store (KVS) over-container 22 and container data structure(s) 20 at DSD 106, and by DSD connector 12 at host 101, which acts as a software bridge interface at host 101 and may be implemented as a plug-in. As discussed in more detail below with reference to FIGS. 3 to 6, container data structure(s) 20 can include one or more data structures of variable size with entries that allow for the access of data stored in at least one non-volatile storage media of DSD 106 (e.g., solid-state memory 142 and/or disk 150 in FIG. 2).

DSD connector 12 can allow existing applications that use standard interfaces such as S3 interface (for object storage) and NFSv3 (for file access) to gain significant improvements in performance, without having to change and recompile application code. In this regard, DSD connector 12 maps and routes requests from applications $14_1$ and $14_2$ to DSD 106. DSD connector 12 can directly access container data structure(s) 20 for files accessed by application $14_1$. For an object interface, DSD connector 12 accesses KVS over container 22 for data objects accessed by application $14_2$. Application 143 uses interface driver 10 to access KVS over container 22 for object-based access, and can optionally use interface driver 10 for a block-based interface of data in at least one non-volatile storage media in DSD 106. Block interface 24 can provide a block-based interface for backward compatibility with legacy applications, such as application 143, which may use a block Application Programming Interface (API) for accessing data. Interface driver 10 can include, for example, a Non-Volatile Memory express (NVMe) driver for communication between host 101 and DSD 106.

The arrangement of FIG. 1B can significantly improve system performance as compared to a system using LSM trees as discussed above with reference to FIG. 1A. In some examples, the arrangement shown in FIG. 1B can provide for at least a 10 times reduction in write amplification and at least a five times reduction in command amplification. The host processor (e.g., processor 102 in FIG. 2) and main memory (e.g., main memory 108 in FIG. 2) overhead is significantly reduced, and data traffic (e.g., PCIe or NVMe traffic) between host 101 and DSD 106 can be reduced by more than 70% since many of the maintenance functions previously performed by the host, such as Garbage Collection (GC) to reclaim portions of solid-state memory $14_2$ and/or disk 150 that store invalid or obsolete data, are no longer managed by the host. In the system shown in FIG. 1B, operations or modules of translation layer 17 are performed within DSD 107 without involvement of host 101.

In the example of FIG. 1B, translation layer 17 includes address remapping 13, GC 15, wear-leveling and Bad Block (BB) management 16, and I/O scheduling 19. Translation layer 17 can include, for example, a Flash Translation Layer (FTL) or a Shingled Magnetic Recording (SMR) Translation Layer (STL) used for address indirection of a solid-state storage media (e.g., solid-state memory 142 in FIG. 2) or a rotating magnetic disk storage media written using overlapping tracks for SMR (e.g., disk 150 in FIG. 2). In other implementations, translation layer 17 may include other operations or modules, such as for performing error correction of data read from solid-state memory 142 and/or disk 150. As discussed above with reference to FIG. 1A, layer 21 may implement other functions, such as a RAID function for parallel operation or data protection, and ECC for correcting data read from memory 141.

The use of translation layer 17 of DSD 106 and other maintenance operations is in contrast to current trends such as Open Channel (OC) Solid-State Storage Devices (SSDs) that do not have a local translation layer at the storage device, but instead rely on the host to manage such operations. In some implementations, a container KVS can operate in a host-based translation layer using OC SSDs, as a global translation layer for multiple networked storage devices, as a host-based Shingled Magnetic Recording (SMR) STL in a Hard Disk Drive (HDD), or as an STL in an SMR HDD array. In yet other implementations, and as discussed in more detail below with reference to FIG. 8, a container KVS architecture can be completely integrated into a DSD without a DSD connector executing at the host.

In this regard, those of ordinary skill in the art will appreciate that other implementations of a container KVS architecture may have a different arrangement or different components than those shown in FIG. 1B. For example, other implementations may not include block interface 24 or interface driver 10 or may include a different set of modules or operations as a part of translation layer 17.

Figure 2:
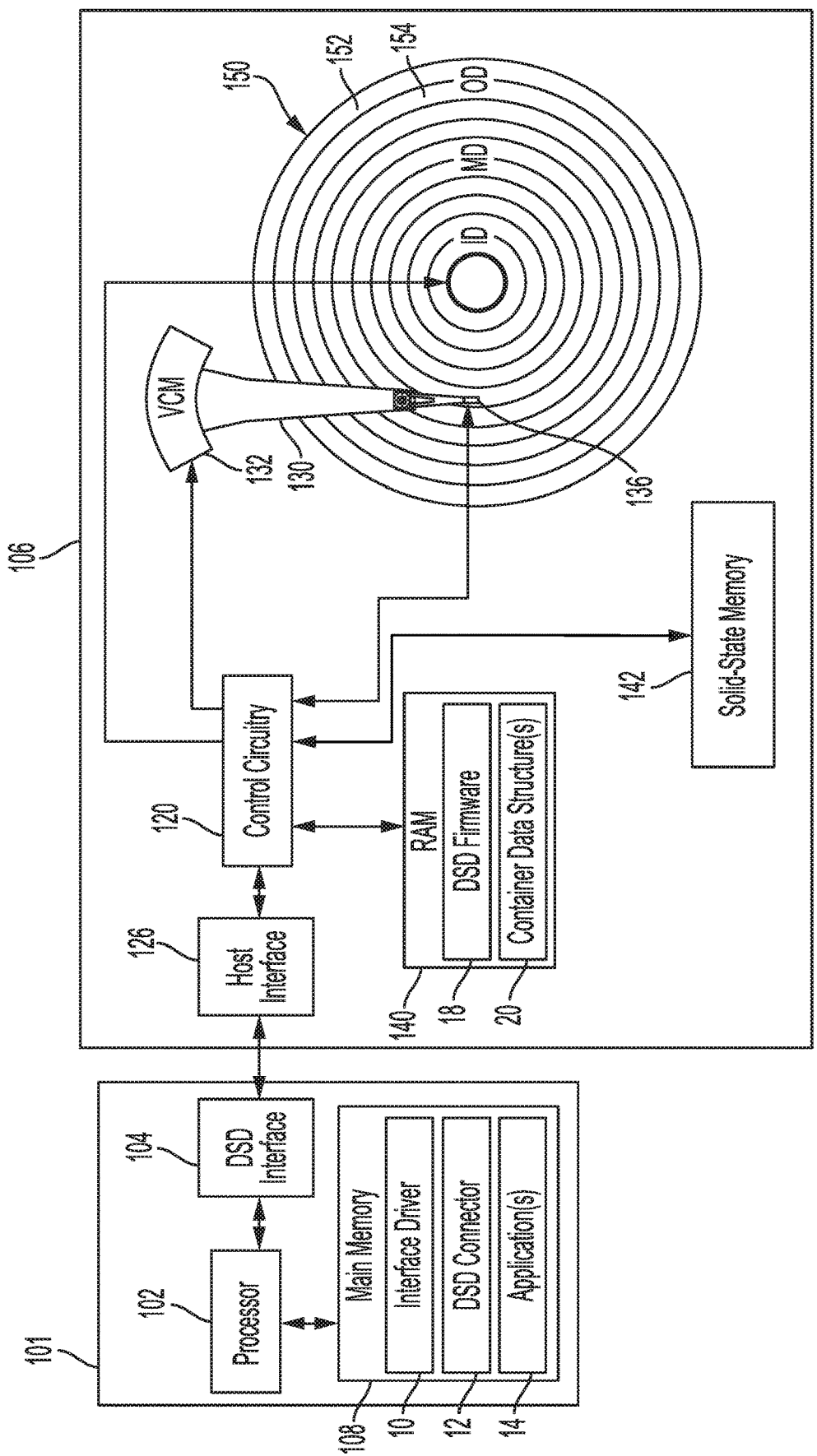
FIG. 2 is a block diagram of a host and a DSD according to an embodiment.

FIG. 2 is a block diagram of host 101 and DSD 106 according to an embodiment. Host 101 communicates with DSD 106 to retrieve data from and store data in DSD 106. In the example of FIG. 2, host 101 is separate from DSD 106, and may include, for example, a client or other computer system. In other embodiments, host 101 may be housed together with DSD 106 as part of a single electronic device, such as, for example, a server, desktop, laptop or notebook computer or another type of electronic device such as a tablet, smartphone, network media player, portable media player, or Digital Video Recorder (DVR). As used herein, a host can refer to a device that is capable of issuing commands to DSD 106 to store data or retrieve data. In this regard, host 101 may include another DSD such as a smart DSD that is capable of executing applications and communicating with other DSDs.

As shown in FIG. 2, host 101 includes processor 102 for executing instructions, such as instructions from interface driver 10, DSD connector 12, and/or one or more applications 14. Processor 102 can include circuitry such as a microcontroller, a Digital Signal Processor (DSP), a Central Processing Unit (CPU), an Application-Specific Integrated Circuit (ASIC), a Field Programmable Gate Array (FPGA), hard-wired logic, analog circuitry and/or a combination thereof. In some implementations, processor 102 can include a System on a Chip (SoC), which may be combined with main memory 104.

Main memory 104 can include, for example, a volatile Random Access Memory (RAM) such as Dynamic RAM (DRAM), a non-volatile RAM, a Storage Class Memory (SCM), or other solid-state memory. Main memory 104 can be used by processor 102 to store data used by processor 102. Data stored in main memory 104 can include data read from DSD 106, data to be stored in DSD 106, instructions loaded from an application executed by processor 102, and/or data used in executing such applications.

Interface driver 10 provides a software interface to DSD 106 and can include instructions for communicating with DSD 106 using a logical interface specification such as NVMe or Advanced Host Controller Interface (AHCI) that may be implemented by DSD connector 12 and/or DSD interface 104. Application(s) 14 can include one or more applications, such as applications $14_1$, $14_2$, and $14_3$ discussed above with reference to FIG. 1B that are executed by processor 102 to read and/or write data in DSD 106.

DSD interface 104 is configured to interface host 101 with DSD 106, and may communicate with DSD 106 using a standard such as, for example, Serial Advanced Technology Attachment (SATA), PCIe, Small Computer System Interface (SCSI), Serial Attached SCSI (SAS), Ethernet, Fibre Channel, or WiFi. In this regard, host 101 and DSD 106 may not be physically co-located and may communicate over a network such as a Local Area Network (LAN) or a Wide Area Network (WAN), such as the internet. As will be appreciated by those of ordinary skill in the art, DSD interface 104 can be included as part of processor 102.

As shown in FIG. 2, DSD 106 includes host interface 126, control circuitry 120, solid-state memory 142, disk 150, and RAM 140. Host interface 126 is configured to interface with host 101 and may communicate with host 101 using a standard such as, for example, SATA, PCIe, SCSI, SAS, Ethernet, Fibre Channel, or WiFi. Control circuitry 120 can include circuitry for executing instructions, such as instructions from DSD firmware 18. In this regard, control circuitry 120 can include circuitry such as one or more processors for executing instructions and can include a microcontroller, a DSP, an ASIC, an FPGA, hard-wired logic, analog circuitry and/or a combination thereof. In some implementations, control circuitry 120 can include an SoC, which may be combined with RAM 140 and/or host interface 126, for example.

In the example of FIG. 2, DSD 106 is a Solid-State Hybrid Drive (SSHD) in that it includes both a solid-state non-volatile storage media (i.e., solid-state memory 142 in FIG. 2) and a rotating magnetic disk storage media (i.e., disk 150 in FIG. 2) for non-volatilely storing data. In other implementations, DSD 106 may only include one of disk 150 or solid-state memory 142 so as to make DSD 106 an HDD or an SSD, respectively. In yet other implementations, DSD 106 can include pools or arrays of HDDs and/or SSDs, as in the examples of FIGS. 7 and 8 discussed in more detail below.

While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., Single-Level Cell (SLC) memory, Multi-Level Cell (MLC) memory (i.e., two or more levels), or any combination thereof), NOR memory, EEPROM, Ferroelectric Memory (FeRAM), Magnetoresistive RAM (MRAM), other discrete NVM chips, or any combination thereof.

As shown in the example of FIG. 2, DSD 106 includes RAM 140, which can include, for example, a volatile RAM such as DRAM, a non-volatile RAM, SCM, or other solid-state memory. RAM 140 can be used by control circuitry 120 to store data used by control circuitry 120. Data stored in RAM 140 can include data read from solid-state memory 142 and/or disk 150, and data to be stored in solid-state memory 142 and/or disk 150. In addition, RAM 140 can store instructions loaded from DSD firmware 18 for execution by control circuitry 120, and/or data used in executing DSD firmware 18, such as container data structure(s) 20.

In the example of FIG. 1, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks. A servo system (not shown) of controller 120 controls the rotation of disk 150 with SM control signal 44 and controls the position of head 136 using VCM control signal 40.

As will be appreciated by those of ordinary skill in the art, disk 150 may form part of a disk pack including multiple disks that are radially aligned with disk 150. In such implementations, head 136 may form part of a Head Stack Assembly (HSA) including heads arranged to read data from and write data to a corresponding disk surface in the disk pack.

As shown in FIG. 2, disk 150 includes storage areas or zones on the disk surface, such as zones 152 and 154. The zones on disk 150 are concentrically laid out from an Outer Diameter (OD) portion of disk 150, through a Middle Diameter (MD) portion, to an Inner Diameter (ID) portion of disk 150. Each storage area includes tracks for storing data on disk 150. The zones on disk 150 can include SMR zones of overlapping tracks or Conventional Magnetic Recording (CMR) zones of non-overlapping tracks.

SMR can allow for a greater storage capacity on disk 150 by increasing the number of Tracks Per Inch (TPI) on disk 150 with narrower overlapping tracks than the non-overlapping tracks used in CMR. However, the overlapping of tracks with SMR means that previously written data cannot be changed or rewritten without affecting an adjacent track. SMR zones are therefore sequentially written in one radial direction to avoid affecting previously written data in the zone. SMR typically uses address indirection as part of an STL of DSD firmware 18 to prevent having to rewrite data that is modified by leaving the old version of the data in the same location on disk 150, writing the modified version of the data in a new location on disk 150, and updating the logical to physical mapping for the modified data from the old physical address to the new physical address.

Similarly, solid-state memory 142 may use an FTL as part of DSD firmware 18 to perform address indirection for wear-leveling, as with wear-level and BB management 16 of layer 17 in FIG. 1B. The FTL may be used for rewriting data from one storage location to another to maintain the integrity of the data (e.g., data recycling or refreshing), as in the case where solid-state memory 142 is a NAND flash memory and/or for relocating valid data from blocks of solid-state memory 142 to be erased for writing new data.

Figure 7:
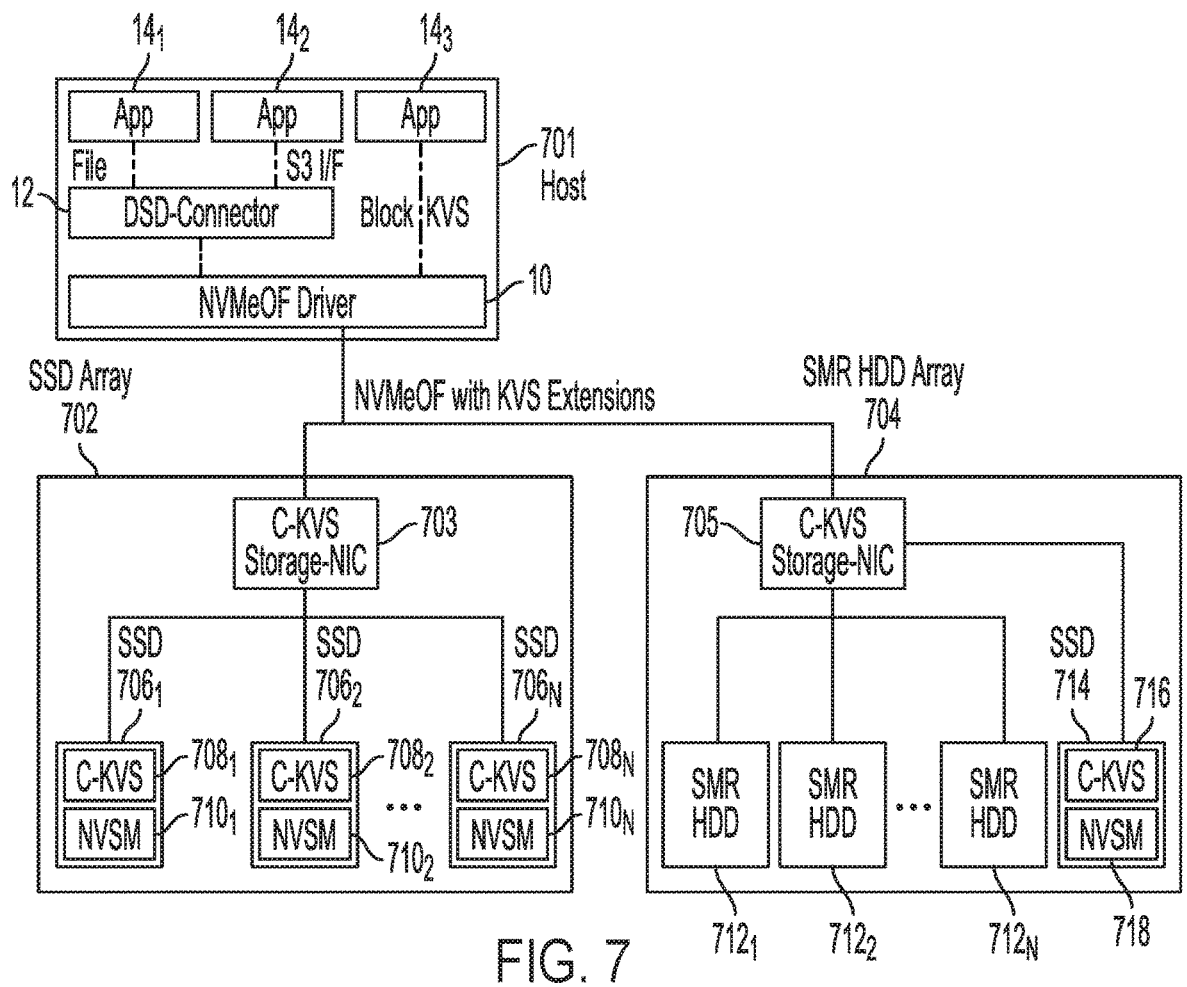
FIG. 7 is a block diagram of a host and DSDs including a Solid-State Drive (SSD) array and a Hard Disk Drive (HDD) array implementing container key value stores according to an embodiment.
Figure 8:
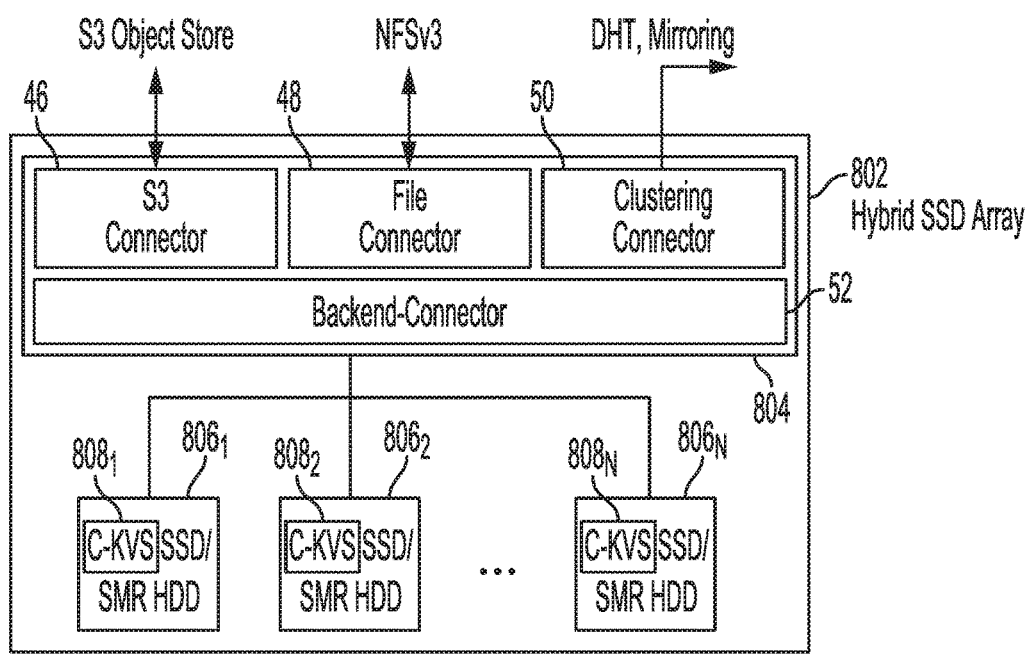
FIG. 8 is a block diagram of a DSD including a hybrid SSD array implementing container key value stores according to an embodiment.

Those of ordinary skill in the art will appreciate that other implementations may include a different arrangement of components or modules than those shown in FIG. 2. For example, other implementations may include multiple hosts and/or pools of DSDs with different types of storage media, such as a combination of SSDs and HDDs that may communicate via a network. For example, FIGS. 7 and 8 provide other implementations where the container KVS architecture of the present disclosure is used in DSD arrays (e.g., DSD arrays 702 and 704 in FIG. 7 and DSD array 802 in FIG. 8).

Figure 3:
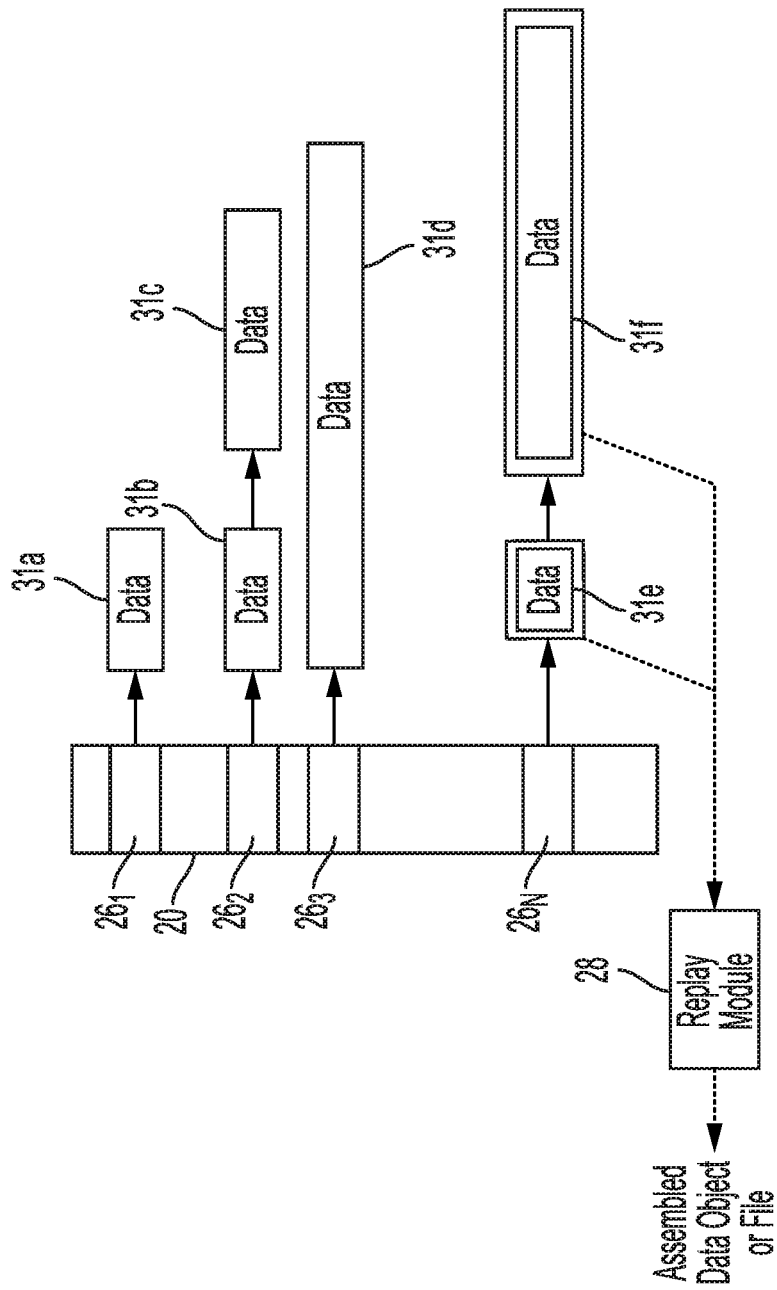
FIG. 3 illustrates an example of an elastic container data structure according to an embodiment.

FIG. 3 illustrates an example of elastic container data structure 20 according to an embodiment. As shown in FIG. 3, container data structure 20 can provide a byte addressable interface or an interface at a finer granularity that is less than a conventional block or page size of 512 Bytes or 4K that can be used as a file content locator. Container data structure 20 is elastic in the sense that it can hold a variable amount of data, and the data containers pointed to by the entries in container data structure 20 can hold a variable amount of data. In one example implementation, container data structure 20 may have a container API including commands such as a read command based on an address offset and a length for the read. An insert command of the container API can be based on an address offset, a length of the data to be inserted, and the data to be inserted. The insert command can be used for prefixing data, appending data or inserting data in the middle of previously stored data. A command for deletion may also be used in the container API based on an address offset and a length for the data to be deleted.

The commands of the container API can provide a byte-addressable format, as opposed to a conventional block addressable format (e.g., an LBA format), for modifying only portions of data previously stored for the data object or file. In more detail, the commands of the container API can overwrite, insert or delete data anywhere in a byte stream at any byte offset of a container, which can have a variable size. This is in contrast to conventional block-based command formats which use a fixed block size where an entire block needs to be rewritten to modify a portion of the block. In the case of deleting a portion of the data object or file, the modified portion of the data written in the at least one non-volatile storage media can include an instruction to delete the modified portion of the data object or file when it is later accessed and assembled into a current version of the data object or file.

An insert command can be particularly useful when a relatively small portion of a file is modified by one of applications 14, such as a change to a small portion of text in a word processing document. Unlike conventional file interfaces that would require rewriting the entire file, the insert command of the API can be used to only write the portion of the file that has changed.

As shown in FIG. 3, the container data structure 20 includes a container table with data container entries $26_1$ to $26_N$ that can be stored in RAM 140. Each entry 26 in container data structure 20 points to data that can have a variable size. Container data structure 20 can use a much finer granularity than that typically used by file systems. For example, container data structure 20 may use an allocation unit size of 32 Bytes, 64 Bytes or 128 Bytes, so that the data containers pointed to by the entries in container data structure 20 are multiples of less than 512 Bytes, rather than multiples of a coarser granularity used by conventional file systems (e.g., a 4K granularity). As discussed in more detail below, the finer granularity provided by data container 20 results in less space amplification (i.e., the amount of storage capacity used for storing particular data) and write amplification.

The data pointed to by entries 26 in container data structure 20 may be located in a different memory of DSD 106 than where container data structure 20 is located. For example, container data structure 20 may be stored in RAM 140, and the data pointed to by container data structure 20 may be located in solid-state memory 142 and/or disk 150. In other implementations, container data structure 20 and the data pointed to by entries 26 may all be stored in the same memory, such as in solid-state memory 142. In yet other implementations, container data structure 20 may be stored in solid-state memory 142 and the data pointed to by entries 26 may be stored on disk 150, or container data structure 20 may be stored on disk 150 with some of the data pointed to by container data structure 20 and other data such as frequently accessed data being stored in solid-state memory 142.

Entries 26 in container data structure 20 point to data using a fixed symbolic link, which points to the most recently added data for a data object or file. In some implementations, entries 26 may include a physical address, such as a Physical Block Address (PBA) indicating a physical storage location in solid-state memory 142 or disk 150 storing the most recently written portion of the data object or file. As shown in FIG. 3, the most recently added data for the data object or file can point to a previous fragment or remainder of the data object or file, which in turn, can point to an even earlier fragment of the data object or file, and so on. These symbolic links through distributed indexing do not change as modifications are made to the data allowing for only the deltas or changes made to the data object or file to be written as needed in various locations throughout solid-state memory $14_2$ and/or disk 150. This can reduce the amount of write amplification in the DSD as compared to conventional file systems, since a modification to the file results in the entire file being rewritten even for a small change to the data in the file. In memories where the file cannot be rewritten in the same location, such modifications to previously written data create space amplification since storage space is wasted by storing invalid or obsolete files in their entirety.

As shown in the example of FIG. 3, a file or data object for entry $26_1$ includes data from data container $31a$. A file or data object for entry $26_2$ includes data from data container $31b$ and data from data container $31c$. Entry $26_3$ points to one larger portion of data in data container $31d$ for a different data object or file. As shown in FIG. 3, the data portions or fragments within a data object or file can have different sizes and include a varying number of data portions or fragments. In the example of FIG. 3, a data object or file corresponding to entry $26_N$ is requested, such as for a host read command, and a first portion of the data object or file, data from data container $31e$, is read, which also points to a second data portion in data container $31f$ for the requested data object or file. Data portions $31e$ and $31f$ are then assembled by replay module 28 of DSD firmware 18 to generate a current version of the data object or file to be returned for the read request. In assembling the current version of the data object or file, it is determined whether a more recently written portion replaces all or part of a previously written portion.

Unlike conventional file systems, a change to a portion of the file using the container KVS architecture does not result in a Read Modify Write (RMW) operation of the old file or data object to rewrite the old file or data object with the newly modified data. Instead, the elastic container data structures of the present disclosure allow for only the changed portion of the file or data object to be written as a smaller data fragment and a log, which is pointed to by container data structure 20. When the file or data object is accessed, a replay engine or replay module of DSD firmware 18 reconstructs or consolidates the fragments to make the data object or file appear as though it was written as one continuous file, even though the data for the data object or file is not stored together in a contiguous location in solid-state memory 142 or disk 150. At some point when GC or wear-leveling may be performed, the fragments may then be consolidated in physical memory. By avoiding the RMW operations of conventional file systems, it is ordinarily possible to reduce space amplification and write amplification at the DSD.

In addition, the finer granularity possible with byte addressing as opposed to block addressing results in less write amplification and space amplification because there is no need to pad portions of blocks that are written for data smaller than the block size. For example, if only 32 Bytes are to be written, current block interfaces would require writing a full page size, such as a 4K page.

Figure 4:
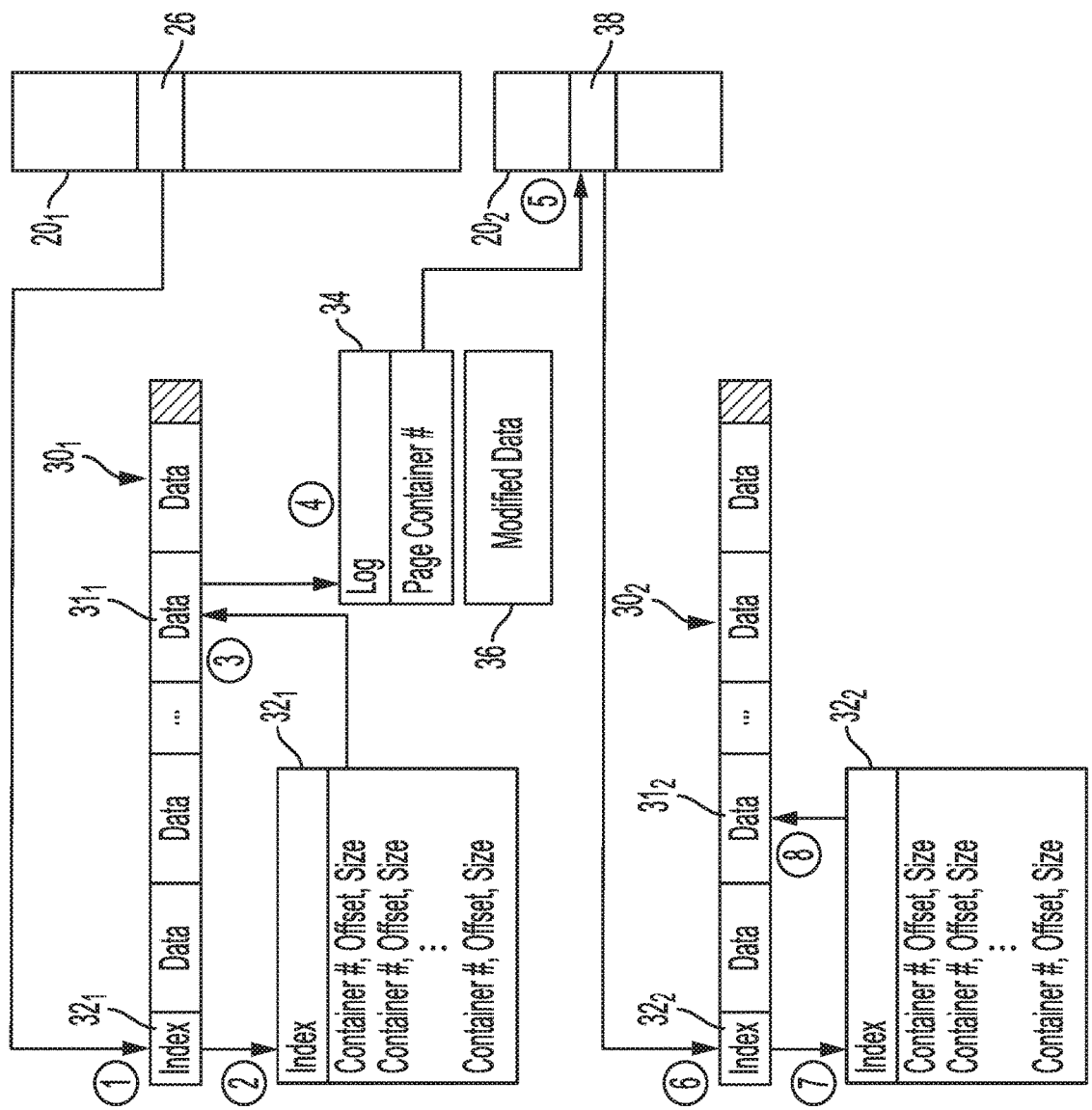
FIG. 4 illustrates an example of accessing a data object or file using container data structures according to an embodiment.

FIG. 4 illustrates an example of accessing a data object or file using container data structures $20_1$ and $20_2$ according to an embodiment. Page container data structure $20_2$ and data container data structure $20_1$ can be part of the same data structure or may be separate data structures. FIG. 4 provides a data layout example with linking between different fragments or portions of a data object or file. The data for a particular file or data object may be stored, for example, in different zones of disk 150 and/or different portions of solid-state memory 142 (e.g., different blocks or pages of solid-state memory 142). Although the chunks or fragments of data may be moved around within DSD 106 due to, for example, independent GC or wear-leveling for the fragments, the links between container data structure $20_1$ and the most recently written data for the file or data object, and the links from the older fragments back to page container data structure $20_2$ are maintained. This allows much of the metadata used for locating the file or data object to remain the same despite modifications made to the file or data object, which is in contrast to conventional file systems and object storage systems where metadata is rewritten each time the file or data object is modified (e.g., with the use of LSM trees discussed above), resulting in write amplification and command amplification.

In the example of FIG. 4, container data structures $20_1$ and $20_2$ can be stored in RAM 140 or solid-state memory 140 as a repurposed Logical-to-Physical (L2P) mapping table or a new type of L2P mapping table. In other implementations, container data structures $20_1$ and $20_2$ may be stored in other quick-access locations, such as in a SCM of DSD 106.

Data container entry 26 in data container data structure $20_1$ first points to a container number for a most recently modified fragment of a data object or file that is stored in multi-plane data page $30_1$ of a block of solid-state memory 142. Index $32_1$ of page $30_1$ identifies the container numbers for the data stored in page $30_1$ with an offset and size so that the requested data can be located within page $30_1$. This is shown in the example of FIG. 4 at the encircled numeral "2".

The located data in data container 311 for the container number accessed in index $32_1$ includes log 34 and modified data 36, which forms a portion of the requested data object or file corresponding to data container entry 26. Log 34 then identifies one or more previous fragments or portions of the requested data object or file with page container numbers that point back to page container data structure $20_2$.

The most recent of the previous fragments or portions is associated in log 34 with a page container number that points to entry 38 in page container data structure $20_2$, which indicates a location of the next most recent fragment of the data object or file. Page container data structure $20_2$ includes the current physical address for the next most recent fragment for the data object or file. If the requested data object or file is completely stored in one location, page entries in page container data structure $20_2$ are not used for the data object or file, since there are no other fragments or portions for the data object or file at that point in time.

In the example of FIG. 4, page entry 38 at the fifth circle points to index $32_2$ in page $30_2$, which is accessed at the sixth circle. Index $32_2$ is accessed to locate the next most recent data portion in data container $31_2$ for the requested data object or file in page $30_2$. The second data portion in data container $31_2$ may then be assembled or replayed with the modified data 36 from the first data portion from data container $31_1$. In this regard, a replay module (e.g., replay module 28 in FIG. 3) may determine whether edits made by modified data 36 replace all or some of the previously written data for the data object or file stored in data container $31_2$. In other cases, modified data may append to a beginning, middle, or end of the previously written data for the data object of file stored in data container $31_2$ as a result of an insert command of the container API described above with reference to FIG. 3.

The link or links back to page container data structure $20_2$ for the previous fragment or fragments remain fixed until the data object or file is deleted or consolidated (e.g., through GC), and only the entries within page container data structure $20_2$ are updated when fragments are moved. This use of page container data structure $20_2$ can allow for durable linking or symbolic links to remain, despite changes to a data object or file that cause fragments of the data object or file to be spread out to different locations in solid-state memory 142 and/or disk 150. Such linking may be used as part of one or more translation layers 17, such as with an STL for disk 150 or an FTL for solid-state memory 142.

Figure 5:
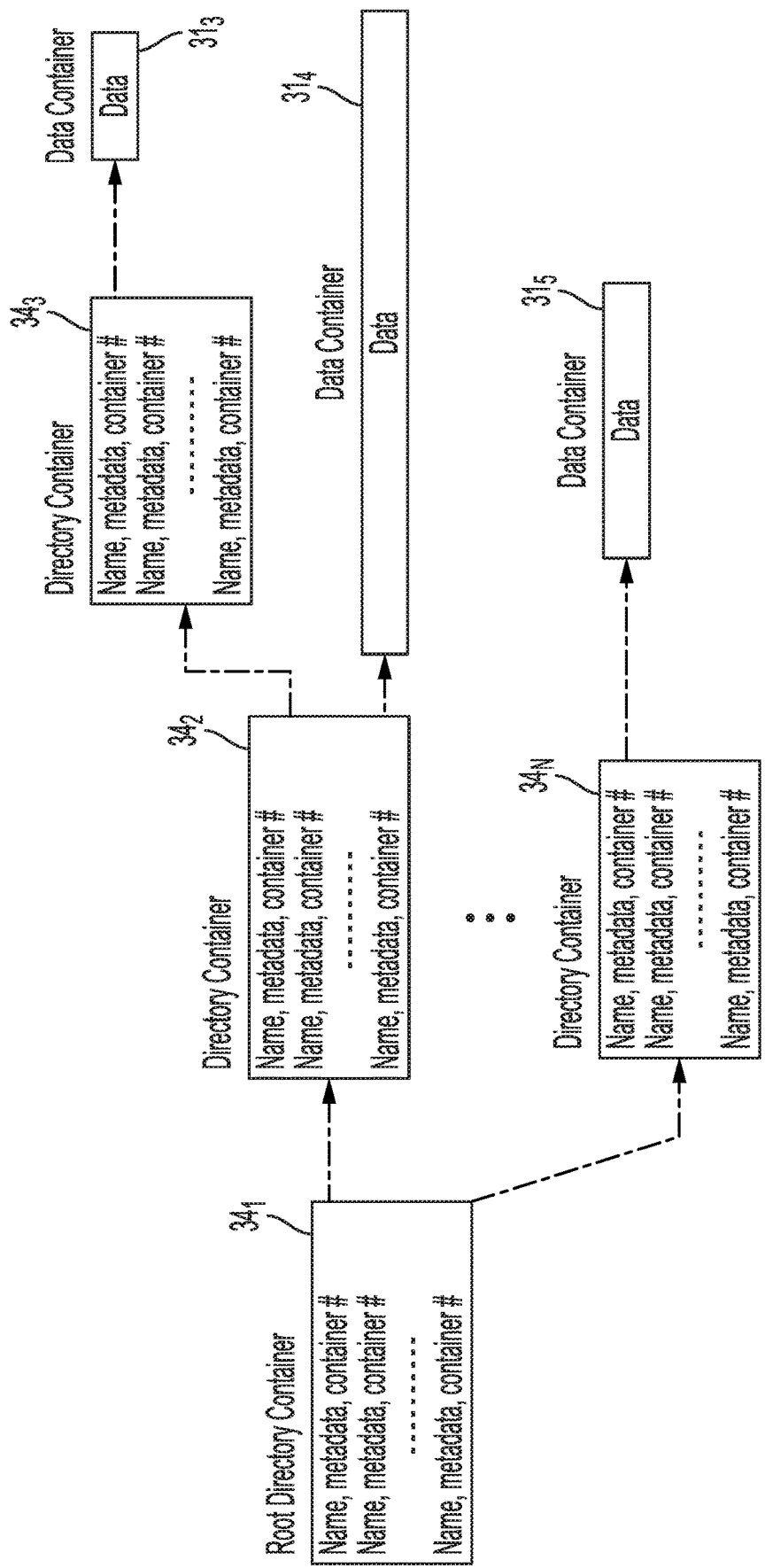
FIG. 5 illustrates an example of using metadata containers and data containers for managing files according to an embodiment.

FIG. 5 illustrates an example of using metadata containers and data containers for managing files according to an embodiment. As shown in FIG. 5, the elastic container architecture of the present disclosure can offload the need for host 101 to execute a file system for managing files. In some implementations, an entry in a container data structure can point to a portion of memory (e.g., a zone of disk 150 or a page of solid-state memory 142) for a directory, which includes an index within the portion of memory used to locate another directory or a file by pointing back to a page container data structure. A file system at DSD 106 can use a KVS API in a layer above the elastic container layer that uses the container number as a key and provides I/O commands to the elastic container layer without the need for a block interface.

The containers in FIG. 5 can serve as either a directory container 34 or a data container 31. A directory container 34 can include a file-path-name fragment, file metadata, and the container number associated with the file. A pathname to the container number mapping can be determined by accessing or traversing a container data structure, an index for a page pointed to by an entry of the container data structure, and a page container entry pointed to by data accessed in the page, which in turn, can point back to another page with an index and another page container entry, if available, as discussed above with reference to the example of FIG. 4.

In the example shown in FIG. 5, an entry in container data structure 20 can point to root directory container $34_1$, which can include pointers for different filenames back to page container data structure $20_2$ for directory containers $34_2$ and $34_N$. A filename in directory container $34_N$ can be identified and an associated page container entry can be accessed in page container data structure $20_2$ for accessing data container $31_5$ for the file. A first filename in directory container $34_2$ can point to a page container entry for directory container $34_3$, which points to another page container entry for data container $31_3$, which stores data for the file with the first filename. A second filename in directory container $34_2$ can point to a page container entry for data container $31_4$, which stores data for the file with the second filename.

The use of containers as directories can replace the use of a file system by the host, while allowing data access in less than a typical page size (e.g., smaller than 4K accesses allowed). This can reduce the space amplification of the DSD as discussed above, since there is not a need to pad pages with null data when less than a page size is written. In addition, write amplification is reduced, since changes to data less than a page size do not require an RMW operation to rewrite the entire page. The host also no longer needs to manage free space, such as by mapping files to LBA ranges and keeping track of free pages, or performing defragmentation of the memory. In addition, the transfer of data between the host and the DSD is reduced since these tasks are handled internally by the DSD.

Figure 6:
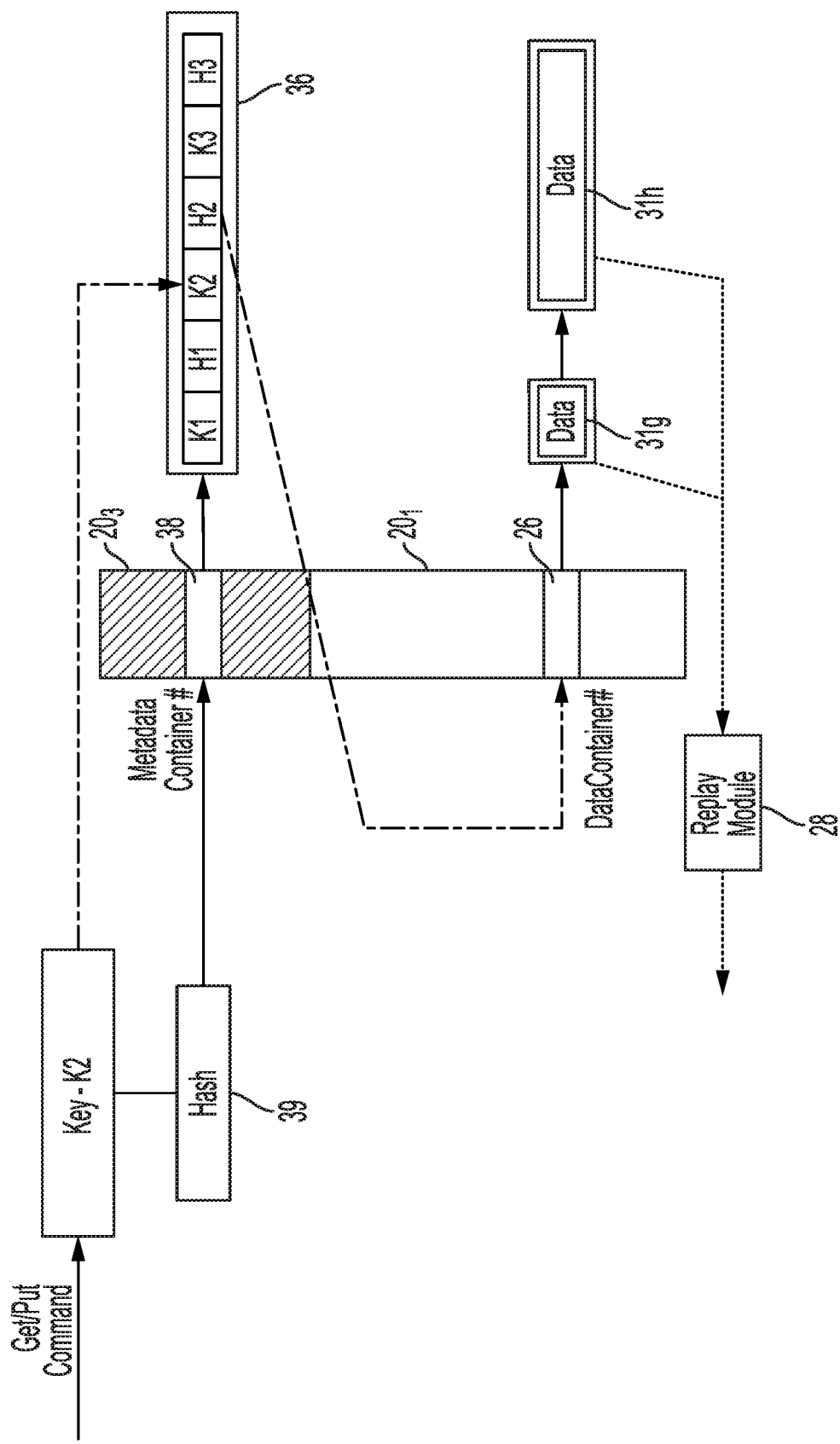
FIG. 6 illustrates an example of accessing a data object or file using a key value store and container data structures according to an embodiment.

FIG. 6 provides an example of a container KVS architecture for accessing data using data container data structure $20_1$ and metadata container data structure 203. As shown in FIG. 6, metadata container data structure 203 is indicated with cross-hatching above data container data structure $20_1$. The number of metadata container entries in metadata container data structure 203 is a fraction of the number of data objects or files represented by data container data structure $20_1$, such as, for example, 0.5% of the number of data container entries in data container data structure $20_1$.

Each metadata container, such as metadata container 36 shown in FIG. 6, holds multiple keys (e.g., keys K1, K2, and K3) that are collided by having the same hash value to provide a dense hash. This dense hash is in contrast to a traditionally desired sparse hash that would otherwise avoid collisions by using, for example, a hash table with ten times the number of objects. The dense hash of the present disclosure can significantly reduce the storage space needed for the metadata container data structure $20_3$ by reducing the number of metadata entries, and can decrease the amount of data needed to represent each metadata container. Such a dense hash can be ensured by setting the size of the hash table as a small percentage or fraction of the number of data objects and files represented by data container data structure $20_1$, such as 0.5% or less of the number of data objects and files represented by data container data structure $20_1$.

In the example shown in FIG. 6, an upper layer application at DSD 106 or at host 101 (e.g., one of applications 14 in FIG. 2) requests data associated with a key K2. In some implementations, the key may be generated from or may be a unique logical address or object ID used by the host. The commands supported by the KVS layer above the elastic container layer can include, for example, get, put, update, head, prefix-scan, and indexed sort commands. The KVS layer performs a hash using hash table 39 and the key K2, which results in the metadata container number for metadata container entry 38 in metadata container data structure $20_3$. Metadata container entry 38 points to a memory location, such as in solid-state memory 142, RAM 140, or on disk 150, that stores metadata container 36 including keys and corresponding data container numbers or handles (e.g., H1 to H3 in FIG. 6). Each key can be associated with one data container number or handle. Although the example shown in FIG. 6 only includes three keys and three handles for purposes of illustration, each metadata container in practice can include many more keys and handles, such as 200 keys and 200 handles.x Metadata container 36 is accessed to find key K2 that was provided by the upper layer application. In this implementation, the entry following key K2 provides the data container number or handle in data container data structure $20_1$ for the data corresponding to key K2. A read request is issued to read data container entry 26 in container data structure $20_1$ that is associated with the data container number determined from reading metadata container 36 to retrieve the data associated with key K2 as discussed above using the distributed indexing provided by page container data structure $20_2$ and the index or indexes in fragments of the data object or file. If there are fragments of the data object or file stored in different memory locations, the fragments are assembled to form a current version of the data object or file as discussed above using replay module 28 for returning the data object or file to the upper layer application.

The key for each data object or file can be established or assigned when the data object is created, and remains the same until the key is deleted when the data object or file is deleted. Unlike the LSM file management discussed above with reference to FIG. 1A, the use of the container KVS does not require a remapping or new mapping every time a data object or file is modified. There is also no merging of files to keep mapping consistent as in LSM file management because the key to container interface keeps the mapping fixed between the unique key and the data container in the container data structure, as well as between the distributed indexes and the page container data structure for the data fragments (if any) for the life of the data object or file (e.g., until the data object or file is identified for deletion). Repeated changes to the data object or file therefore do not result in a change in the mapping of the metadata, which is in contrast to the conventional consolidation or merging of metadata for a data object or file using a LSM tree.

FIG. 7 is a block diagram of host 701, SSD array 702, and SMR HDD array 704 according to an embodiment. The Container KVS (C-KVS) arrangement discussed above can be implemented either with the use of a DSD connector (e.g., DSD connector 12 in FIGS. 1B and 7) running at a host as shown in FIG. 7, or as a fully integrated implementation in a DSD as shown in the example of FIG. 8 discussed in more detail below. The examples shown in FIGS. 7 and 8 include a combination of SSDs and SMR HDDs. As will be appreciated by those of ordinary skill in the art, other arrangements of DSDs can implement a C-KVS architecture with or without a DSD connector executed by a host.

In the example of FIG. 7, host 701 acting as a server accesses SSD array 702 including SSDs 706, and SMR HDD array 704 including SMR HDDs 712 and SSD 714 for storing metadata. Similar to the example of host 101 in FIG. 1B discussed above, host 701 includes applications $14_1$ and $14_2$ that use DSD connector 12 and an interface driver (i.e., NVMe Over Fibre-Channel (OF) driver 10 in FIG. 7) to access files and data objects, respectively, in SSD array 702 and in SMR HDD array 704. Application $14_3$ uses a block interface and NVMeOF driver 10 to access data objects or files in SSD array 702 and SMR HDD array 704.

Each of SSD array 702 and SMR HDD array 704 has a C-KVS Network Interface Card (NIC) that can allow for host 701 to interface with the DSDs using NVMeOF and identify the keys for data objects or files that are being accessed by host 701. In such cases, the C-KVS can have one or more hardware accelerators (e.g., FPGAs or other circuitry) for performing dedicated tasks related to the communication protocol and/or handling of the keys and associated data. Within SSD array 702, each SSD 706 can have its own C-KVS architecture 708 for accessing metadata containers and data containers stored in a Non-Volatile Solid-State Memory (NVSM) 710.

SMR HDD array 704, on the other hand, can use a dedicated SSD, SSD 714, for storing C-KVS 716 in NVSM 718, including data container data structure $20_1$, page container data structure $20_2$, and metadata data structure $20_3$. NVSM 718 may also store metadata containers, such as metadata container 36 in the example of FIG. 6 discussed above. NVSM 718 may also store data containers for data fragments that have been most recently written and/or data containers for the most frequently accessed files or data objects (i.e., hot data). In other implementations, all of the metadata containers and data containers may be stored on disks of SMR HDDs 712.

FIG. 8 is a block diagram of hybrid SSD array 802 implementing container key value stores in SSHDs 806 according to an embodiment. As shown in FIG. 8, backend connector 52 executed by storage controller 804 provides one or more interfaces for different types of data access, such as for data object access with S3 connector 46, file access with file connector 48, and clustered data access through clustering connector 50. Each SSHD 806 in Hybrid SSD array 802 has its own C-KVS architecture 808 (e.g., data container data structure $20_1$, page container data structure $20_2$, and metadata container data structure $20_3$) for performing the mapping functions described above. Those of ordinary skill in the art will appreciate that other implementations may include a different arrangement of DSDs or modules than those shown in FIGS. 7 and 8.

Example Processes

Figure 9:
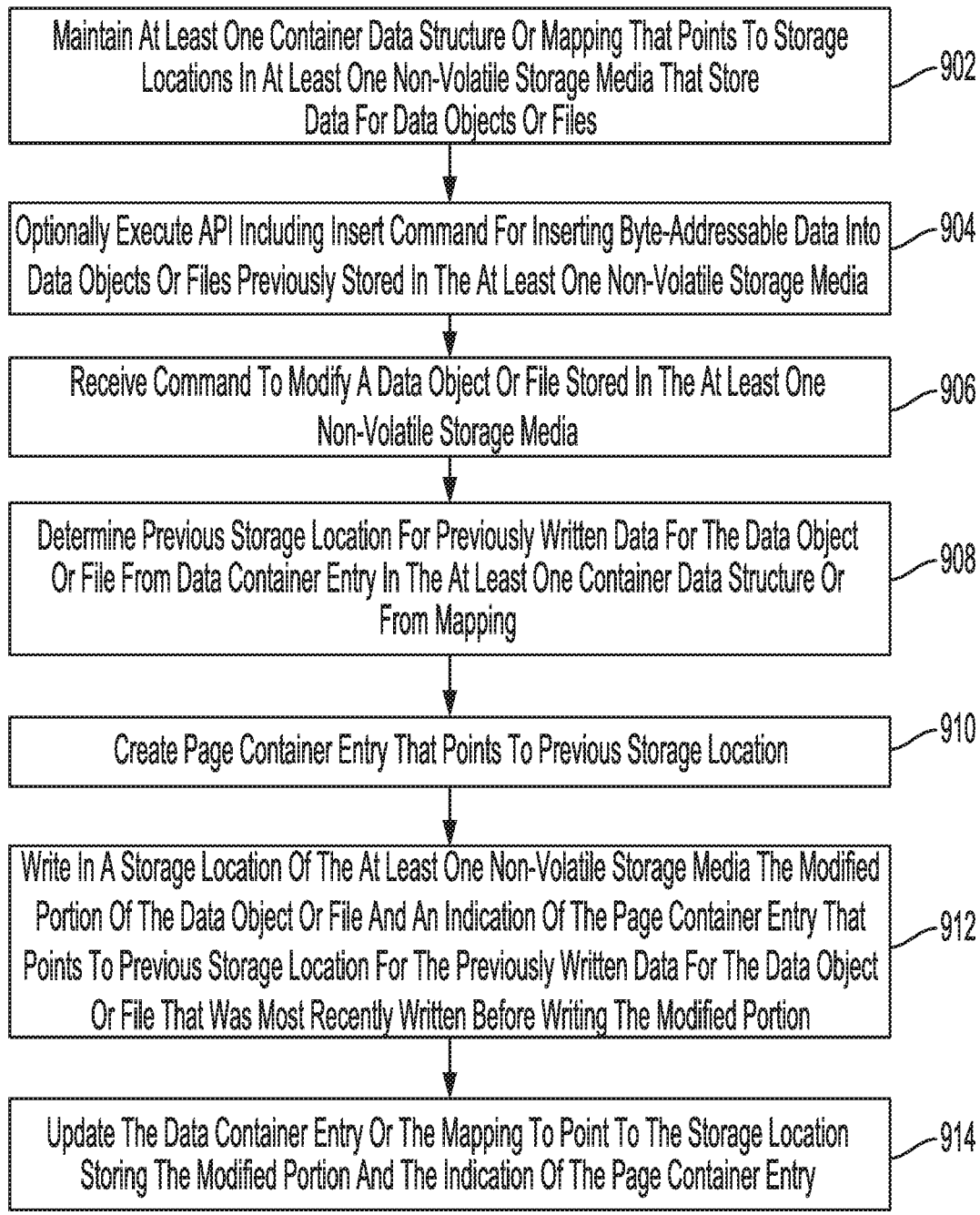
FIG. 9 is a flowchart for a data modification process according to an embodiment.

FIG. 9 is a flowchart for a data modification process according to an embodiment. The process of FIG. 9 can be performed, for example, by control circuitry of one or more DSDs (e.g., control circuitry 120 in FIG. 2, C-KVS storage NICs 703 and 704 with control circuitry of SSDs 706 and 714 in FIG. 7, or storage controller 804 with control circuitry of SSHDs 806 in FIG. 8) executing a DSD firmware (e.g., DSD firmware 18 in FIG. 2).

In block 902, at least one container data structure or mapping is maintained, such as one or more of data container data structure $20_1$, page container data structure $20_2$, and metadata container data structure $20_3$. As discussed above, the container data structures or mapping points to storage locations in at least one non-volatile storage media of a DSD (e.g., solid-state memory 142 and/or disk 150 in FIG. 2) that store data for data objects or files. The data may include the whole data object or file, or may include fragments of the data object or file as the data object or file is modified over time.

In block 904, the control circuitry optionally executes a container API including an insert command for inserting byte-addressable data into data objects or files previously stored in the at least one non-volatile storage media of the DSD. As discussed above, the data can be inserted at a beginning, middle or end of the previously written data. In addition, the container API can allow for the deletion of byte-addressable data within the data object or file.

In block 906, the control circuitry receives a command to modify a data object or file stored in the at least one non-volatile storage media. The command may come from an application executing on a host (e.g., one of applications 14 executing at host 101 in FIG. 2) to modify the data object or file. The command is byte-addressable, such as for the above-described container API, for modifying only portions of data previously stored for the data object or file. In more detail, the command can overwrite, insert or delete data anywhere in the byte stream at any byte offset of a container, which can have a variable size. This is in contrast to conventional block-based commands, which use a fixed block size where an entire block needs to be rewritten to modify a portion of the block. In the case of deleting a portion of the data object or file, the modified portion of the data written in the at least one non-volatile storage media can include an instruction to delete the modified portion of the data object or file when it is later accessed and assembled into a current version of the data object or file.

In block 908, the control circuitry determines a previous storage location or data container for previously written data for the data object or file from a data container entry in the at least one container data structure (e.g., container data structure(s) 20 in FIG. 2). In some implementations, a data container data structure may be directly accessed by the control circuitry to determine the previous storage location as in the example of FIG. 3 discussed above where data container entries 26 point to data containers 31. In other implementations, a KVS may be used as in the example of FIG. 6 discussed above. In such implementations, the control circuitry may perform a hash function to obtain a metadata container number for a metadata container entry (e.g., metadata container entry 38 in FIG. 6) in a metadata container data structure (e.g., metadata container data structure $20_3$), and access the corresponding metadata container (e.g., metadata container 36 in FIG. 6) to identify a handle or data container number for a data container entry (e.g., data container entry 26 in FIG. 6) in a data container data structure (e.g., data container data structure $20_1$ in FIG. 6), which points to the memory location or data container for the previously stored data for the file or data object.

In block 910, the control circuitry creates a page container entry that points to the previous storage location. With reference to the example of FIG. 4 discussed above, page container entry 38 would be created in elastic page container data structure 20$_2$ in response to the received command to modify the data object or file.

In block 912, the control circuitry writes in a storage location of the at least one non-volatile storage media of the DSD the modified portion of the data object or file together with an indication of the page container entry created in block 910 that points to the previous storage location for the previously written data that was most recently written for the data object or file before writing the modified portion. With reference to the example of FIG. 4 discussed above, a data portion or data container 31 would be written in page 30$_2$ with a log, such as log 34 including a page container number for page container entry 38 in page container data structure 20$_2$.

In block 914, the control circuitry updates the data container entry or mapping used in block 908 to determine the previous storage location, so that the data container entry (e.g., data container entry 26 in data container data structure 20$_1$ in the example of FIG. 4) points to the storage location or data container storing the modified portion and the indication of the page container entry. As discussed above, the use of elastic container data structures ordinarily allows for data to be modified with granularities or sizes less than a conventional page or block size (e.g., a 4K page or block size) and without rewriting an entire file or data object. This can significantly reduce the amount of write amplification, space amplification, and command amplification generated by modifications made to files and data objects, as compared to conventional systems. In addition, and as noted above, the use of container data structures as in the present disclosure can replace file systems used at the host and/or replace LSM trees that add to write amplification and command amplification when data is modified.

Figure 10:
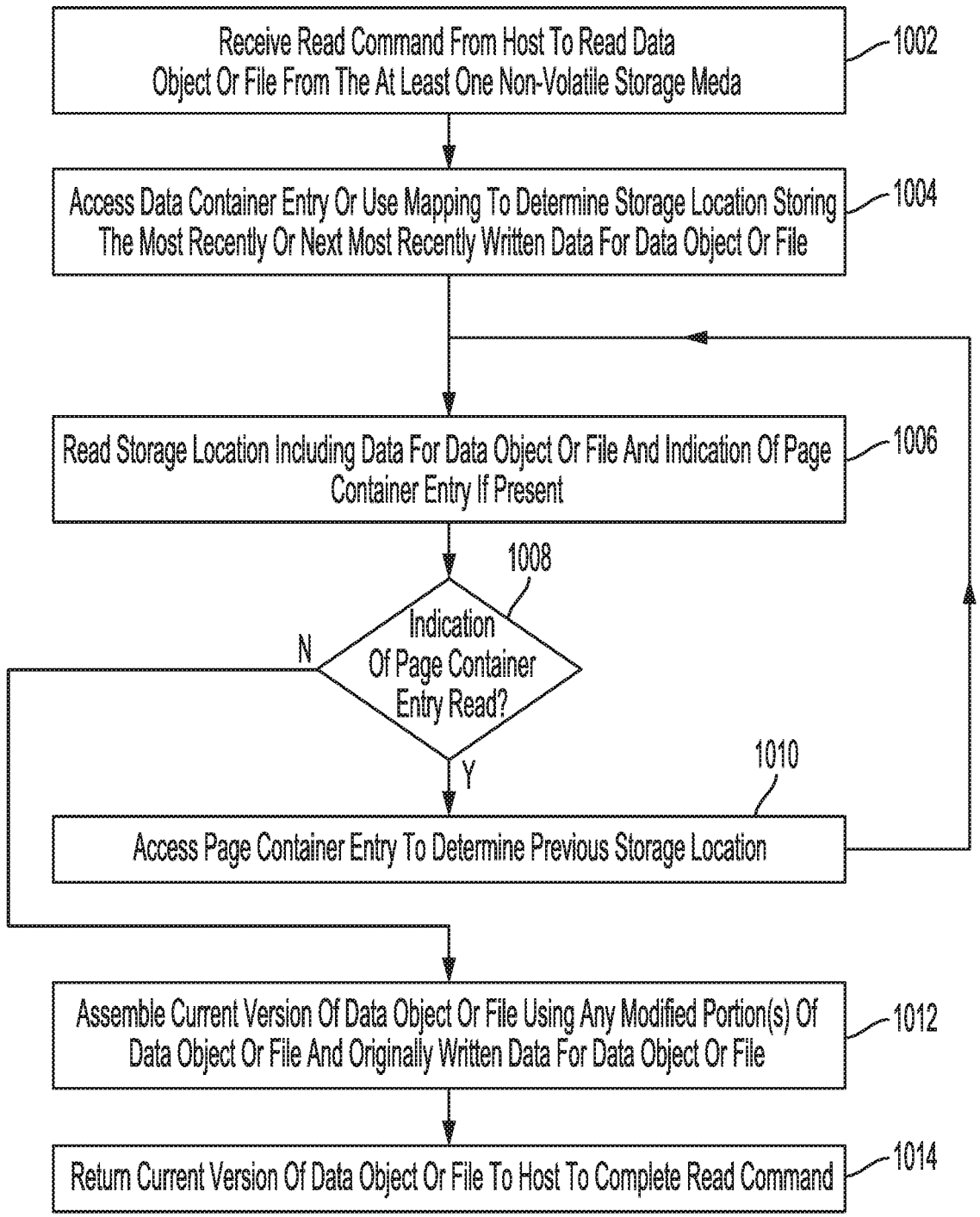
FIG. 10 is a flowchart for a data read process according to an embodiment.

FIG. 10 is a flowchart for a data read process according to an embodiment. The process of FIG. 10 can be performed, for example, by control circuitry of one or more DSDs (e.g., control circuitry 120 in FIG. 2, C-KVS storage NICs 703 and 704 with control circuitry of SSDs 706 and 714 in FIG. 7, or storage controller 804 with control circuitry of SSHDs 806 in FIG. 8) executing a DSD firmware (e.g., DSD firmware 18 in FIG. 2).

In block 1002, a read command is received from a host to read a data object or a file from at least one non-volatile storage media of a DSD. The read command may initiate from, for example, an application such as one of applications 14 in the example of FIG. 2.

In block 1004, the control circuitry accesses a data container entry in a container data structure or uses mapping to determine a storage location or data container storing the most recently written data for the data object or file, or the next most recently written data in subsequent iterations of block 1004 following block 1010. In cases where there have been no previous changes to the file or data object, there may only be one data container or storage location for the requested data object or file.

In some implementations, a data container data structure may be directly accessed by the control circuitry to determine the storage location of the most recently written data for the data object or file, as in the example of FIG. 3 discussed above where data container entries 26 point to data containers 31. In other implementations, a KVS may be used as in the example of FIG. 6 discussed above. In such implementations, the control circuitry may perform a hash function to obtain a metadata container number for a metadata container entry (e.g., metadata container entry 38 in FIG. 6) in a metadata container data structure (e.g., metadata container data structure 20$_3$), and access the corresponding metadata container (e.g., metadata container 36 in FIG. 6) to identify a handle or data container number for a data container entry (e.g., data container entry 26 in FIG. 6) in a data container data structure (e.g., data container data structure 20$_1$ in FIG. 6), which points to the storage location or data container for the most recently written data for the file or data object.

In block 1006, the control circuitry reads the storage location determined in block 1004, which includes data for the data object or file and an indication of a page container entry, if present. If there has been earlier data written for the data object or file, the data read in block 1006 will include an indication of a page container entry for determining the next most recently written data for the requested data object or file.

If it is determined in block 1008 that there is not an indication of a page container entry in the storage location or data container, such as if there is not a log 34 or a page container number in the example of FIG. 4, the read process of FIG. 10 proceeds to block 1012 to assemble a current version of the data object or file using the originally written data for the data object or file.

On the other hand, if it is determined that there is an indication of a page container entry in block 1008, the read process of FIG. 10 proceeds to block 1010 to access the page container entry to determine a previous storage location for a fragment of the data object or file. With reference to the example of FIG. 4 discussed above, page container entry 38 would be accessed in elastic page container data structure 20$_2$ to determine the next most recent storage location or data container. The read process then returns to block 1006 to read the next most recent storage location or data container including data for the requested data object or file and any indication of another page container entry for a next most recently written data portion, if present.

In block 1012, a current version of the data object or file is assembled using any modified portions of the data object or file and the originally written data for the data object or file read in block 1006. As discussed above, a replay module of the DSD firmware (e.g., replay module 28 in FIG. 6) may assemble or perform the modifications to the data object or file before the current version of the data object or file is returned to the host to complete the read command in block 1014.

The control circuitry executing the replay module can determine whether any modified portions of the data object or file replace at least a portion of previously written data for the data object or file. One or more of the modified portions may completely or partially overwrite or delete data for the file or data object, or may only add to the previously written data at a beginning, middle or end of the data object or file. In this regard, the edits or modifications to the file or data object are deferred until the data object or file is requested. In addition to allowing for varying sizes of data portions or fragments to be written at a finer granularity in different locations in the memory of the DSD (e.g., in solid-state memory 142 or disk 150) on the fly, the deferring of the assembling or editing to assemble a current version of the data object or file can improve the write performance of the DSD. This can ordinarily make the read performance and write performance (e.g., a read Input/Output Operations Per Second (IOPS) and a write IOPS) of memories that may have a slower write performance, such as a flash NAND memory, more symmetrical or even, which can improve system efficiency.

Figure 11:
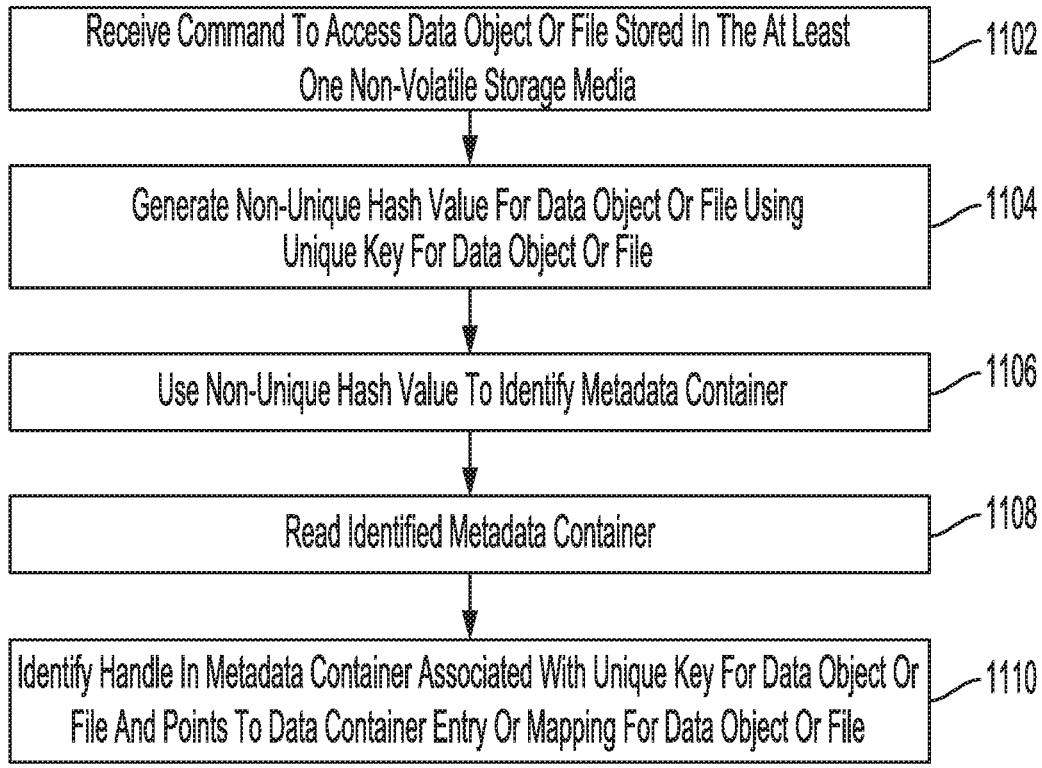
FIG. 11 is a flowchart for a key value store data access process according to an embodiment.

FIG. 11 is a flowchart for a KVS data access process according to an embodiment. The process of FIG. 11 can be performed, for example, by control circuitry of one or more DSDs (e.g., control circuitry 120 in FIG. 2, C-KVS storage NICs 703 and 704 with control circuitry of SSDs 706 and 714 in FIG. 7, or storage controller 804 with control circuitry of SSHDs 806 in FIG. 8) executing a DSD firmware (e.g., DSD firmware 18 in FIG. 2).

In block 1102, the control circuitry receives a command to access a data object or file stored in at least one non-volatile storage media of the DSD (e.g., solid-state memory 142 or disk 150). The command may come from an application executing on a host (e.g., one of applications 14 executing at host 101 in FIG. 2) to access the data object or file. The command may be a write command to modify the data object or file or may be a read command to read the data object or file. The command includes a byte-addressable format, such as for the above-described container API, for modifying only portions of data previously stored for the data object or file. In more detail, the command can overwrite, insert or delete data anywhere in the byte stream at any byte offset of a container, which can have a variable size. In the case of deleting a portion of the data object or file, the modified portion of the data written in the at least one non-volatile storage media can include an instruction to delete the modified portion of the data object or file when it is later accessed and assembled into a current version of the data object or file.

In block 1104, the control circuitry generates a non-unique hash value for the data object or the file using a unique key for the data object or file. In some implementations, the unique key can be generated from or may be a unique logical address or object ID used by the host. As discussed above with reference to the example of FIG. 6, the hash function provides a dense hash where multiple keys collide with the same hash value, which is in contrast to a traditionally desired sparse hash that would otherwise avoid collisions by using, for example, a hash table with ten times the number of objects. Such a dense hash can significantly reduce the storage space needed for a metadata container data structure (e.g., metadata container data structure $20_3$ in FIG. 6) by reducing the number of metadata container entries, and can decrease the amount of data needed to represent each metadata container. Such a dense hash can be ensured by setting the size of the hash table as a small percentage or fraction of the number of the total data objects and files, such as 0.5% or less of the total number of data objects and files.

In block 1106, the control circuitry uses the non-unique hash value, which may be a metadata container number to identify the metadata container. With reference to the example of FIG. 6, the non-unique hash value identifies metadata container entry 38, which points to metadata container 36. The metadata container may be stored for example, in a solid-state memory (e.g., solid-state memory 142 in FIG. 2), a disk (e.g., disk 150 in FIG. 2), or in a RAM (e.g., RAM 140 in FIG. 2). In this regard, the metadata container may be stored in the same memory or a different memory as the metadata container.

In block 1108, the identified metadata container is read to identify a handle or data container number in block 1110 that is associated with the unique key for the data object or file. The handle or data container number points to a data container entry in a data container data structure (e.g., data container entry 26 in data container data structure $20_1$ in FIG. 6). From the data container entry, the data container for the most recently written data for the data object or file can be identified, as discussed above with reference to the examples in FIGS. 3, 4, and 6.

Figure 12:
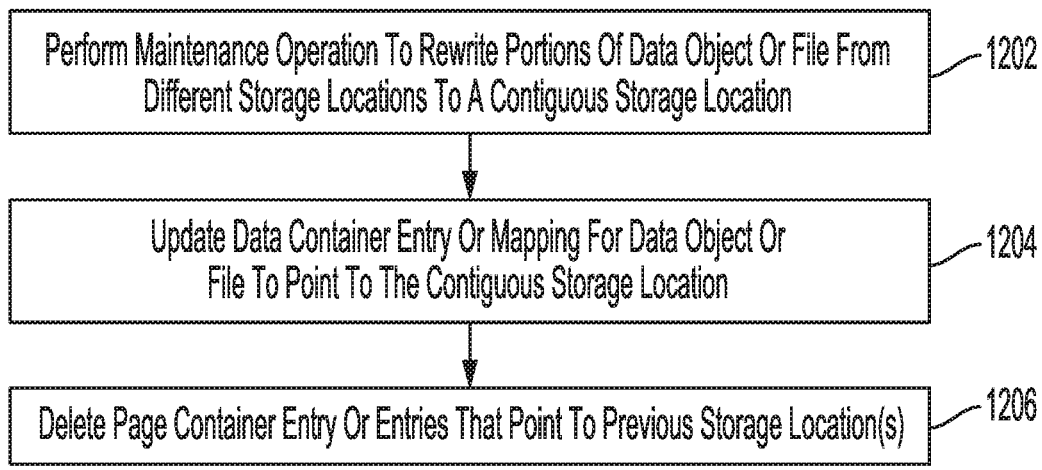
FIG. 12 is a flowchart for a data rewrite process according to an embodiment.

FIG. 12 is a flowchart for a data rewrite process according to an embodiment. The process of FIG. 12 can be performed, for example, by control circuitry of one or more DSDs (e.g., control circuitry 120 in FIG. 2, C-KVS storage NICs 703 or 704, control circuitry of SSDs 706 or SSD 714 in FIG. 7, storage controller 804, or control circuitry of SSHDs 806 in FIG. 8) executing a DSD firmware (e.g., DSD firmware 18 in FIG. 2).

In block 1202, the control circuitry performs a maintenance operation to rewrite portions of a data object or file from different storage locations to a contiguous storage location. The maintenance operation can include, for example, a GC process to reclaim portions of non-volatile storage media storing invalid or obsolete data or may be part of a defragmentation process to conserve storage space in the non-volatile storage media. In some implementations, the maintenance operation may be performed periodically or may be performed in response to reaching a threshold, such as a remaining storage capacity or an amount of invalid or obsolete data.

In block 1204, the control circuitry updates the data container entry or mapping for the data object or file to point to the contiguous storage location. The contiguous storage location may be in a different location in the non-volatile storage media or in the same location as one of the previous data fragments or portions of the data object or file.

In block 1206, the control circuitry deletes any page containers for the file or data object that may have pointed to previous storage locations for data fragments that have been consolidated in the contiguous storage location as a result of the memory operation. As discussed above with reference to the modification process of FIG. 9, new page container entries are created as the file or data object is modified.

The foregoing arrangements of container data structures ordinarily allow for different sizes of data to be written at a finer granularity with less write amplification and command amplification than conventional file and data object management, such as with LSM trees. In addition, the elimination of such file and data object management at the host can prevent the duplication of functions and modules at the host, such as with address remapping, space management, and data compaction or GC functions, that are already implemented by a translation layer (e.g., FTL for a flash memory or STL for an SMR HDD) of the DSD. This also results in less write amplification and command amplification as compared to conventional systems that duplicate these functions at the host level and at the DSD level.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, and modules described in connection with the examples disclosed herein may be implemented or performed with a processor or control circuitry, such as, for example, a Central Processing Unit (CPU), a MPU, a Microcontroller Unit (MCU), or a DSP, and can include, for example, an FPGA, an ASIC, or other programmable logic device, discrete gate or transistor logic, discrete hardware components, or any combination thereof designed to perform the functions described herein. A processor or control circuitry may also be implemented as a combination of computing devices, e.g., a combination of a DSP and an MPU, a plurality of MPUs, one or more MPUs in conjunction with a DSP core, or any other such configuration. In some implementations, the control circuitry or processor may form at least part of an SoC.

The activities of a method or process described in connection with the examples disclosed herein may be embodied directly in hardware, in a software module executed by a processor or control circuitry, or in a combination of hardware and software. The steps of the method or algorithm may also be performed in an alternate order from those provided in the examples. A software module may reside in RAM memory, flash memory, ROM memory, EPROM memory, EEPROM memory, other types of solid state memory, registers, hard disk, removable media, optical media, or any other form of storage medium known in the art. An exemplary storage medium is coupled to a processor or a controller such that the processor or control circuitry can read information from, and write information to, the storage medium. In the alternative, the storage medium may be integral to the processor or the control circuitry.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive.

What is claimed is:

1. A method for operating a Data Storage Device (DSD) including at least one non-volatile storage media for storing data, the method comprising:
receiving a command to modify a data object or file stored in the at least one non-volatile storage media, wherein the command is byte-addressable for overwriting only a portion of the data object or file, deleting only a portion of the data object or file, or inserting new data into the data object or file stored in the at least one non-volatile storage media;
writing in a storage location of the at least one non-volatile storage media the modified portion of the data object or file and an indication of a page container entry that points to a previous storage location for previously written data for the data object or file that was most recently written in the at least one non-volatile storage media before writing the modified portion;
updating a mapping for the data object or file to point to the storage location in the at least one non-volatile storage media storing the modified portion of the data object or file and the indication of the page container entry;
generating a non-unique hash value for a data object or file to be accessed from the at least one non-volatile storage media using a unique key for the data object or file to be accessed; and
using the generated non-unique hash value to identify the mapping for the data object or file to be accessed by at least:
reading a metadata container that is identified by the generated non-unique hash value; and
identifying a handle in the metadata container that is associated with the unique key for the data object or file and points to the mapping for the data object or file.

2. The method of claim 1, further comprising creating at least one container data structure that points to storage locations in the at least one non-volatile storage media that store data for data objects or files, wherein the mapping and the page container for the data object or file are stored in the at least one container data structure.

3. The method of claim 2, wherein the data for the data objects or files stored in the storage locations pointed to by the at least one container data structure have varying sizes with a minimum size that is less than a page size of the at least one non-volatile storage media.

4. The method of claim 1, further comprising executing an Application Programming Interface (API) including an insert command for inserting byte-addressable data into data objects or files previously stored in the at least one non-volatile storage media.

5. The method of claim 1, further comprising:
determining the previous storage location from the mapping for the data object or file before updating the mapping; and
creating the page container entry that points to the previous storage location.

6. The method of claim 1, further comprising:
receiving a read command from a host to read the data object or file from the at least one non-volatile storage media;
using the mapping to determine the storage location in the at least one non-volatile storage media storing the modified portion of the data object or file and the indication of the page container entry;
reading the modified portion of the data object or file and the indication of the page container entry that points to the previous storage location in the at least one non-volatile storage media for the previously written data that was most recently written for the data object or file before writing the modified portion;
accessing the page container entry to determine the previous storage location;
reading from the previous storage location the previously written data that was most recently written for the data object or file before writing the modified portion;
assembling a current version of the data object or file using the modified portion of the data object or file and the previously written data for the data object or file; and
returning the current version of the data object or file to the host to complete the read command.

7. The method of claim 1, wherein in assembling a current version of the data object or file, the method further comprises determining whether the modified portion of the data object or file replaces at least a portion of the previously written data for the data object or file.

8. The method of claim 1, further comprising:
performing a maintenance operation to rewrite portions of the data object or file from different storage locations in the at least one non-volatile storage media to a contiguous storage location;
updating the mapping for the data object or file to point to the contiguous storage location; and
deleting the page container entry that points to the previous storage location.

9. The method of claim 1, wherein a link between the unique key and the mapping for the data object or file to be accessed remains fixed from an initial storage of the data object or file in the at least one non-volatile storage media to when the data object or file is identified for deletion.

10. The method of claim 1, further comprising using a dense hash function to generate the same non-unique hash value for a plurality of unique keys, and wherein a total number of metadata containers is limited to a fraction of a total number of data objects or files stored in the at least one non-volatile storage media so that each of the metadata containers is associated with multiple unique keys for different data objects or files.

11. A Data Storage Device (DSD), comprising:
at least one non-volatile storage media configured to store data; and
control circuitry configured to:
maintain at least one container data structure that points to storage locations in the at least one non-volatile storage media that store data for data objects or files, wherein data container entries in the at least one container data structure point to storage locations for data having varying sizes with a minimum size that is less than a page size of the at least one non-volatile storage media;
receive a command to modify a data object or file stored in the at least one non-volatile storage media, wherein the command is byte-addressable for overwriting only a portion of the data object or file, deleting only a portion of the data object or file, or inserting new data into the data object or file stored in the at least one non-volatile storage media;
write the modified portion of the data object or file and an indication of a page container entry at a storage location in the non-volatile storage media, wherein the page container entry is stored in the at least one container data structure and points to a previous storage location in the at least one non-volatile storage media for previously written data for the data object or file that was most recently written before writing the modified portion; and
update a data container entry in the at least one container data structure for the data object or file to point to the storage location in the at least one non-volatile storage media storing the modified portion of the data object or file and the indication of the page container entry.

12. The DSD of claim 1, wherein the at least one container data structure includes a data container entry for each data object or file stored in the at least one non-volatile storage media that points to a most recently written storage location in the at least one non-volatile storage media storing the most recently written data for the data object or file.

13. The DSD of claim 11, wherein the minimum size is less than 512 bytes.

14. The DSD of claim 11, wherein the control circuitry is further configured to execute an Application Programming Interface (API) including an insert command for inserting byte-addressable data into data objects or files previously stored in the at least one non-volatile storage media.

15. The DSD of claim 11, wherein the control circuitry is further configured to:
determine the previous storage location by reading the data container entry for the data object or file before updating the data container entry; and
create the page container entry that points to the previous storage location.

16. The DSD of claim 11, wherein the control circuitry is further configured to:
receive a read command from a host to read the data object or file from the at least one non-volatile storage media;
access the data container entry for the data object or file in the at least one container data structure to determine the storage location in the at least one non-volatile storage media storing the modified portion of the data object or file and the indication of the page container entry;
read the modified portion of the data object or file and the indication of the page container entry that points to the previous storage location in the at least one non-volatile storage media for the previously written data that was most recently written for the data object or file before writing the modified portion;
access the page container entry to determine the previous storage location;
read from the previous storage location the previously written data that was most recently written for the data object or file before writing the modified portion;
assemble a current version of the data object or file using the modified portion of the data object or file and the previously written data for the data object or file; and
return the current version of the data object or file to the host to complete the read command.

17. The DSD of claim 11, wherein in assembling a current version of the data object or file, the control circuitry is further configured to determine whether the modified portion of the data object or file replaces at least a portion of the previously written data for the data object or file.

18. The DSD of claim 11, wherein the control circuitry is further configured to:
perform a maintenance operation to rewrite portions of the data object or file from different storage locations in the at least one non-volatile storage media to a contiguous storage location;
update the data container entry for the data object or file in the at least one container data structure to point to the contiguous storage location; and
delete the page container entry from the at least one container data structure that points to the previous storage location.

19. The DSD of claim 11, wherein the control circuitry is further configured to:
generate a non-unique hash value for a data object or file to be accessed from the at least one non-volatile storage media using a unique key for the data object or file; and
use the generated non-unique hash value to identify a data container entry in the at least one container data structure for the data object or file to be accessed.

20. The DSD of claim 19, wherein in using the generated non-unique hash value to identify the data container entry for the data object or file to be accessed, the control circuitry is further configured to:
   read a metadata container identified by the generated non-unique hash value; and
   identify a handle in the metadata container that is associated with the unique key for the data object or file to be accessed and points to the data container entry for the data object or file to be accessed.

21. The DSD of claim 20, wherein a mapping between the unique key and the data container entry for each data object or file remains fixed from an initial storage of the data object or file in the at least one non-volatile storage media to when the data object or file is identified for deletion.

22. The DSD of claim 20, wherein the control circuitry is further configured to use a dense hash function to generate the same non-unique hash value for a plurality of unique keys, and wherein a total number of metadata containers is limited to a fraction of a total number of data objects or files stored in the at least one non-volatile storage media so that each of the metadata containers is associated with multiple unique keys for different data objects or files.

23. A non-transitory computer readable medium storing computer-executable instructions, wherein when the computer-executable instructions are executed by control circuitry of a Data Storage Device (DSD), the computer-executable instructions cause the control circuitry to:
   create at least one container data structure that points to storage locations in at least one non-volatile storage media of the DSD that store data for data objects or files, wherein data container entries in the at least one container data structure point to storage locations for data having varying sizes with a minimum size that is less than a page size of the at least one non-volatile storage media;
   receive a command to modify a data object or file stored in the at least one non-volatile storage media, wherein the command is byte-addressable for overwriting only a portion of the data object or file, deleting only a portion of the data object or file, or inserting new data into the data object or file stored in the at least one non-volatile storage media;
   write the modified portion of the data object or file and an indication of a page container entry at a storage location in the at least one non-volatile storage media, wherein the page container entry is stored in the at least one container data structure and points to a previous storage location in the at least one non-volatile storage media for previously written data for the data object or file that was most recently written before writing the modified portion; and
   update a data container entry in the at least one container data structure for the data object or file to point to the storage location in the at least one non-volatile storage media storing the modified portion of the data object or file and the indication of the page container entry.

* * * * *